(12) United States Patent
Hirai

(10) Patent No.: US 7,929,398 B2
(45) Date of Patent: Apr. 19, 2011

(54) OPTICAL PICKUP AND OPTICAL DATA PROCESSING DEVICE USING THE SAME

(75) Inventor: Hideaki Hirai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 12/403,463

(22) Filed: Mar. 13, 2009

(65) Prior Publication Data
US 2009/0231982 A1     Sep. 17, 2009

(30) Foreign Application Priority Data

Mar. 14, 2008 (JP) .................................. 2008-065713

(51) Int. Cl.
G11B 7/135     (2006.01)
(52) U.S. Cl. .............................. 369/112.04; 369/109.01
(58) Field of Classification Search .................. None
See application file for complete search history.

(56) References Cited

U.S. PATENT DOCUMENTS

| | | | |
|---|---|---|---|
| 5,333,021 A * | 7/1994 | Mitsutake et al. | 353/122 |
| 6,385,158 B1 | 5/2002 | Takagi et al. | |
| 6,567,355 B2 * | 5/2003 | Izumi et al. | 369/44.41 |
| 7,197,003 B2 | 3/2007 | Hirai et al. | |
| 7,215,609 B2 * | 5/2007 | Shimano et al. | 369/44.37 |
| 7,227,819 B2 * | 6/2007 | Kadowaki et al. | 369/44.41 |
| 7,345,967 B2 | 3/2008 | Hirai | |
| 7,385,906 B2 | 6/2008 | Hirai | |
| 7,450,486 B2 | 11/2008 | Hirai | |
| 7,706,216 B2 * | 4/2010 | Arai | 369/44.26 |
| 2003/0179680 A1 | 9/2003 | Park et al. | |
| 2006/0177745 A1 | 8/2006 | Huh et al. | |
| 2006/0198254 A1 | 9/2006 | Hirai et al. | |
| 2007/0030770 A1 | 2/2007 | Hirai | |
| 2007/0081431 A1 | 4/2007 | Watanabe et al. | |
| 2007/0133372 A1 | 6/2007 | Hirai | |
| 2007/0147216 A1 | 6/2007 | Hirai | |

(Continued)

FOREIGN PATENT DOCUMENTS

EP     1 684 274 A2     7/2006
(Continued)

OTHER PUBLICATIONS

Extended European Search Report and Search Opinion (5 pages).

*Primary Examiner* — Joseph H Feild
*Assistant Examiner* — Parul Gupta
(74) *Attorney, Agent, or Firm* — Dickstein Shapiro LLP

(57) ABSTRACT

An optical pickup including a light source, two light focus devices, a light reception device, a polarization selective light path splitting device, a polarization switching device, a first diffraction element including a periodic structure including two kinds of sub-wavelength convexo-concave structures while the two kinds of sub-wavelength convexo-concave structures alternately arranged at right angles to each other, and the filling factors of the two kinds of sub-wavelength convexo-concave structures are determined to substantially equalize effective refractive indices of the two kinds of sub-wavelength convexo-concave structures with regard to the polarization direction of the outgoing light beam, and the second diffraction element having a structure similar to that of the first diffraction element except that the filling factors are determined to substantially equalize effective refractive indices of the two kinds of sub-wavelength convexo-concave structures with regard to a polarization direction perpendicular to the polarization direction of the outgoing light beam.

5 Claims, 24 Drawing Sheets

U.S. PATENT DOCUMENTS

| | | |
|---|---|---|
| 2007/0217011 A1 | 9/2007 | Kiyosawa et al. |
| 2007/0223350 A1 | 9/2007 | Hirai |
| 2008/0008078 A1 | 1/2008 | Hirai |
| 2008/0106789 A1 | 5/2008 | Hirai et al. |

FOREIGN PATENT DOCUMENTS

| | | |
|---|---|---|
| EP | 1 892 705 A2 | 2/2008 |
| JP | 7-272303 | 10/1995 |
| JP | 2004-318958 | 11/2004 |
| JP | 2005-285305 | 10/2005 |
| JP | 2005-327338 A | 11/2005 |
| JP | 2006-216233 | 8/2006 |
| JP | 2007-179677 | 7/2007 |
| JP | 2009070533 A * | 4/2009 |
| KR | 10-2006-0089550 A | 8/2006 |
| WO | WO 2006/013526 A2 | 2/2006 |

* cited by examiner

FIG. 2
(a)
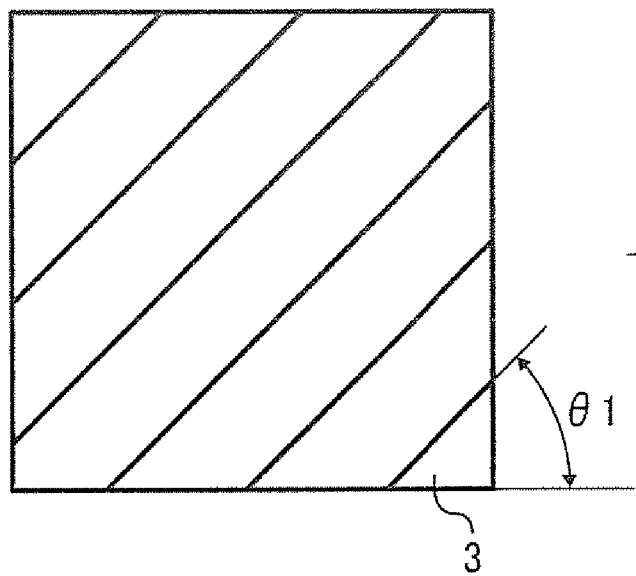
(b)
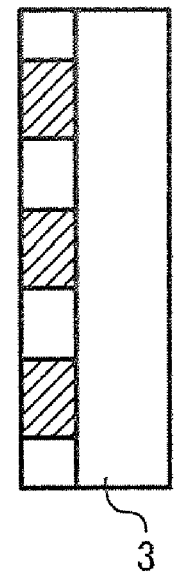
(c)
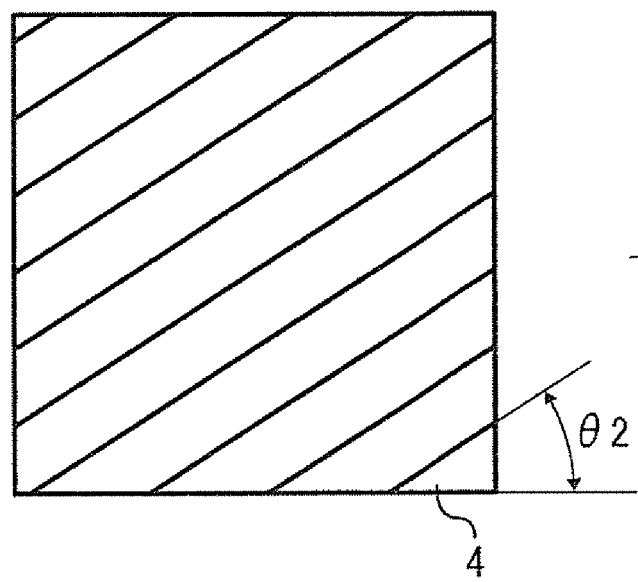
(d)
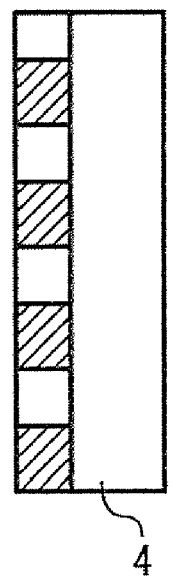

FIG. 4
(a)
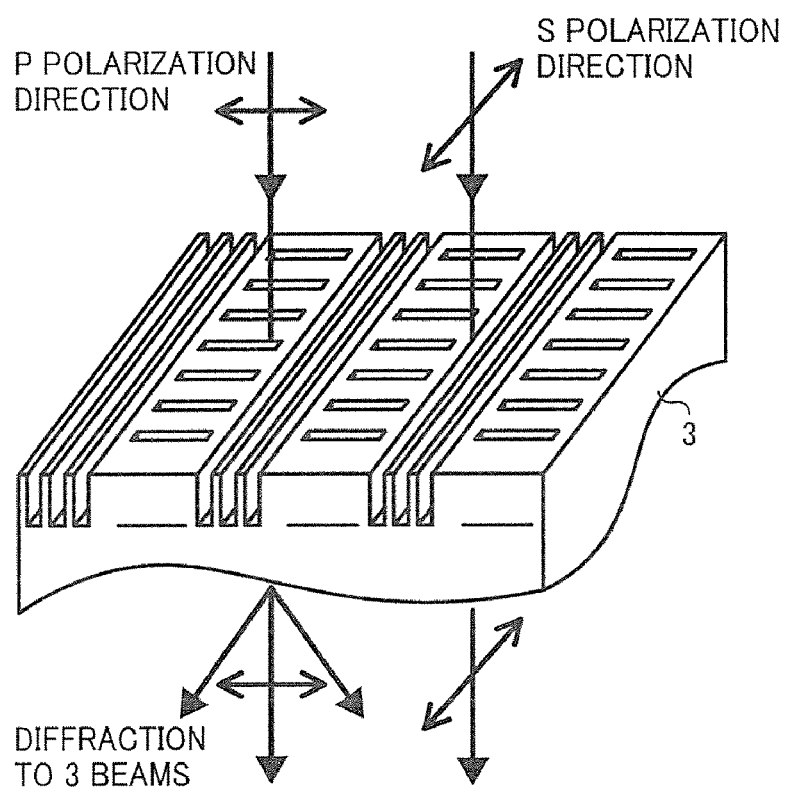
(b)
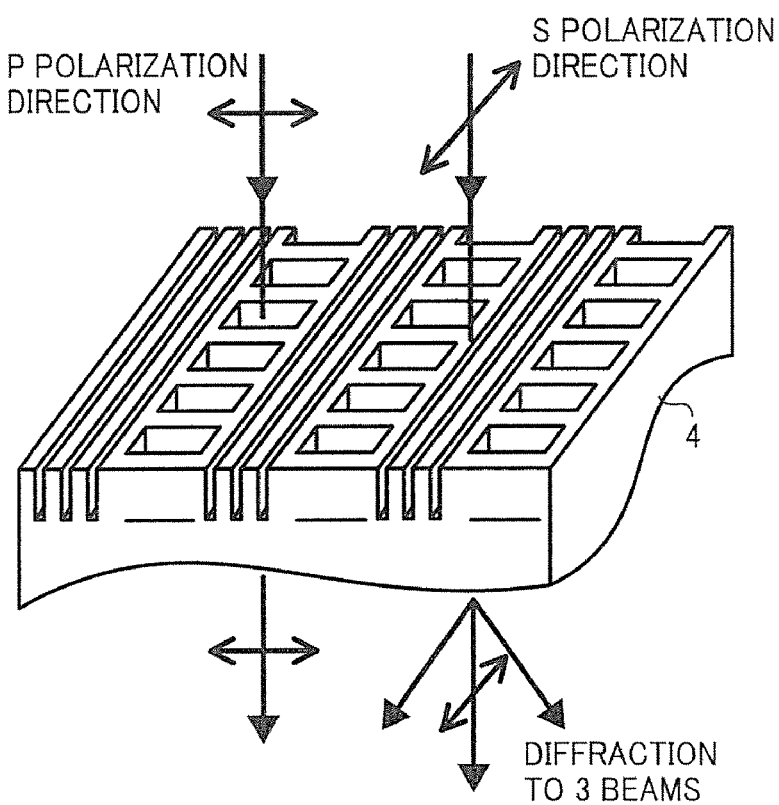

FIG. 7
(a) HD
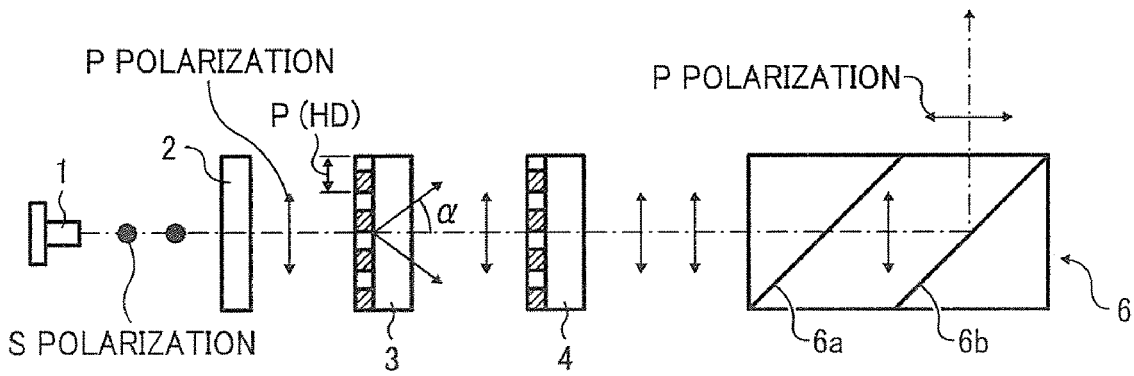
(b) BD
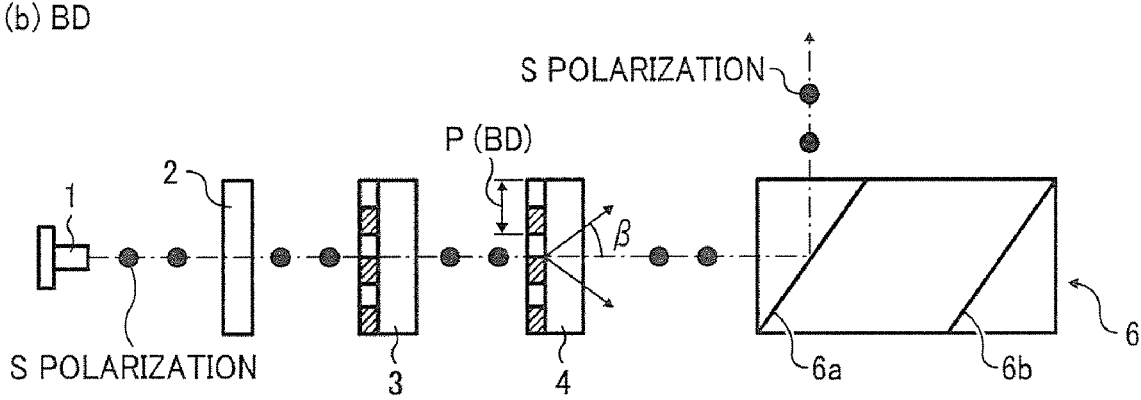
FIG. 8
(a) 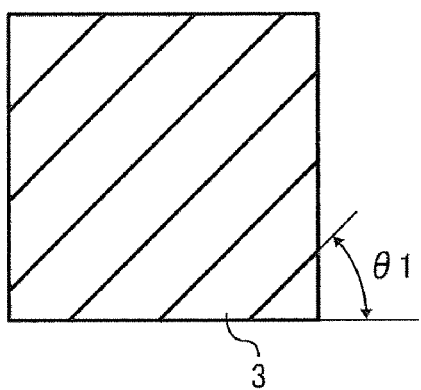 (b) 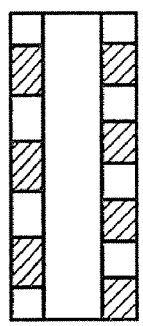 (c) 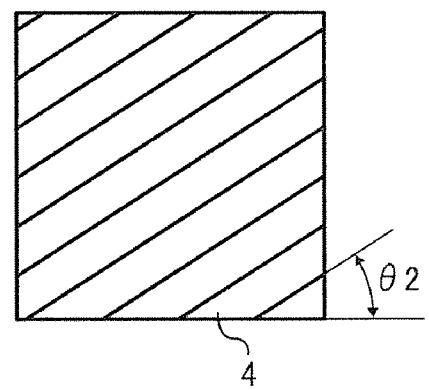

FIG. 12
(a) HD
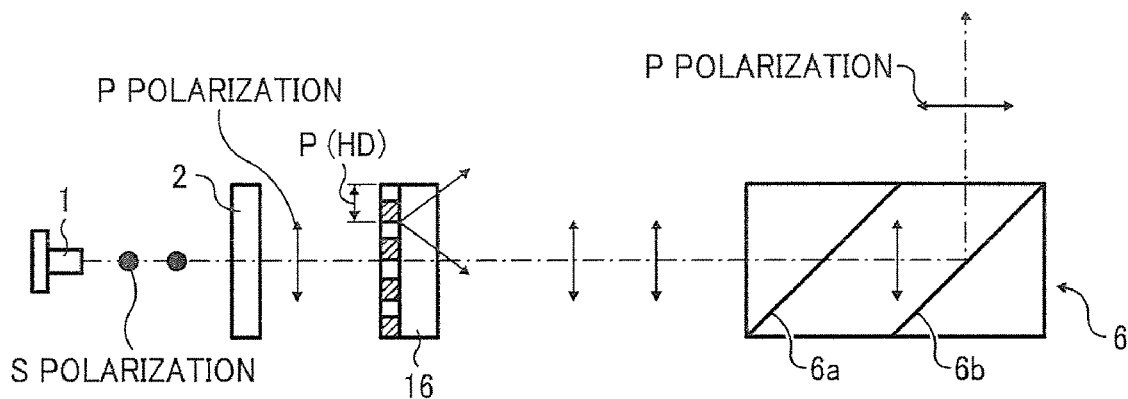
(b) BD
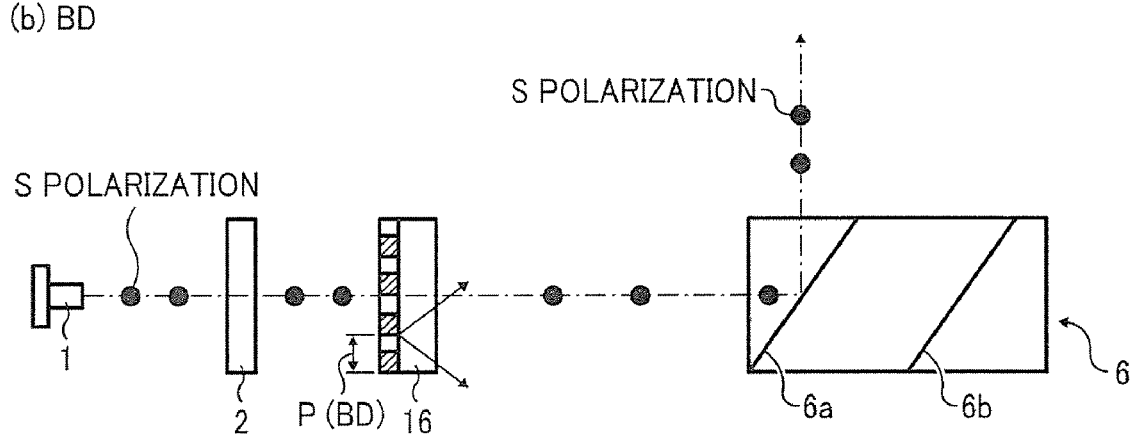

FIG. 14
(a) PERSPECTIVE VIEW
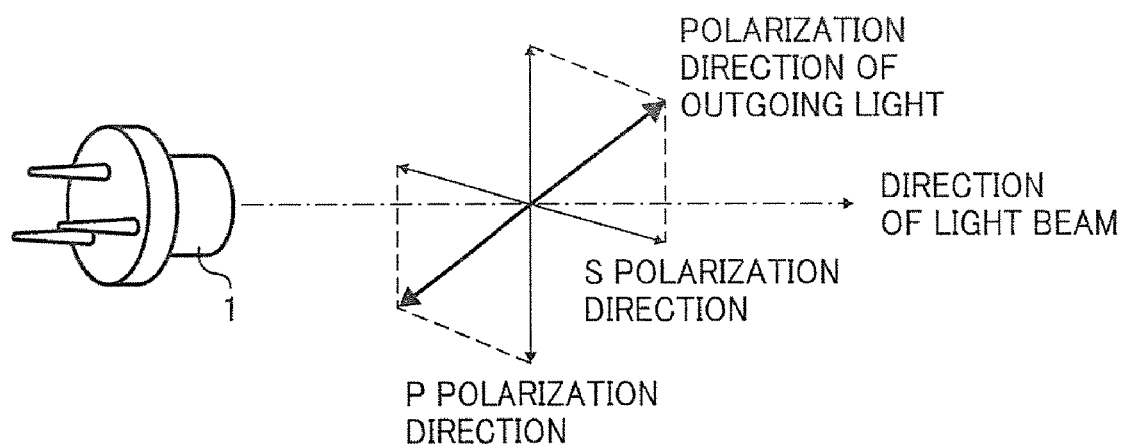
(b) DIFFRACTION AT DIFFRACTION ELEMENTS
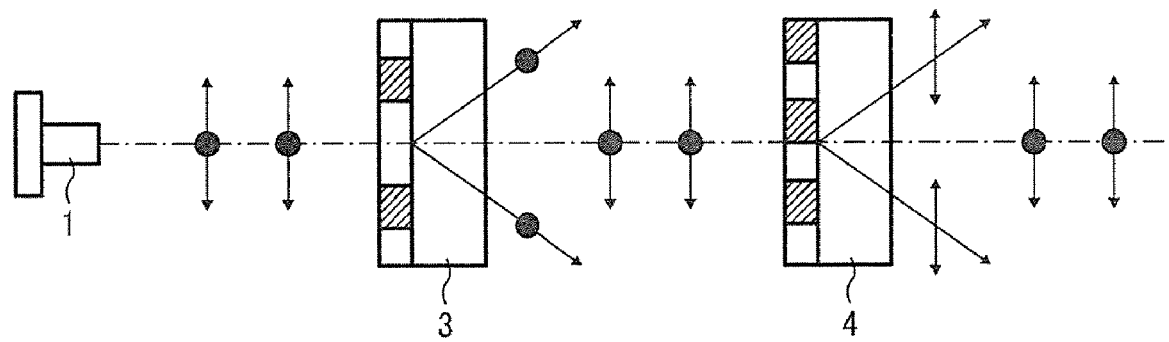

FIG. 17
(a) HD DIFFRACTION
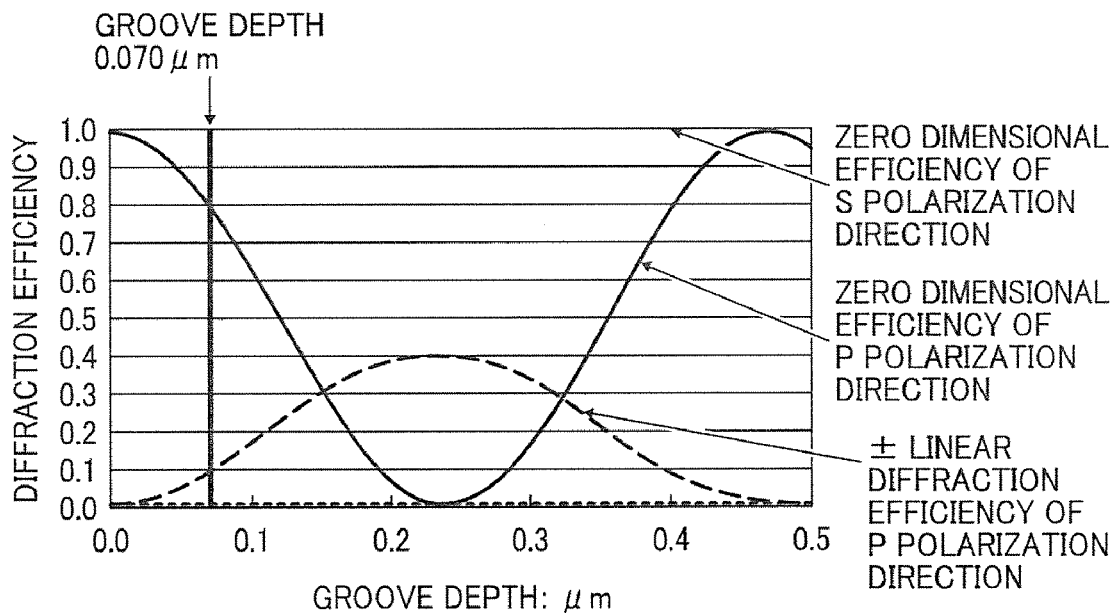
(b) BD DIFFRACTION
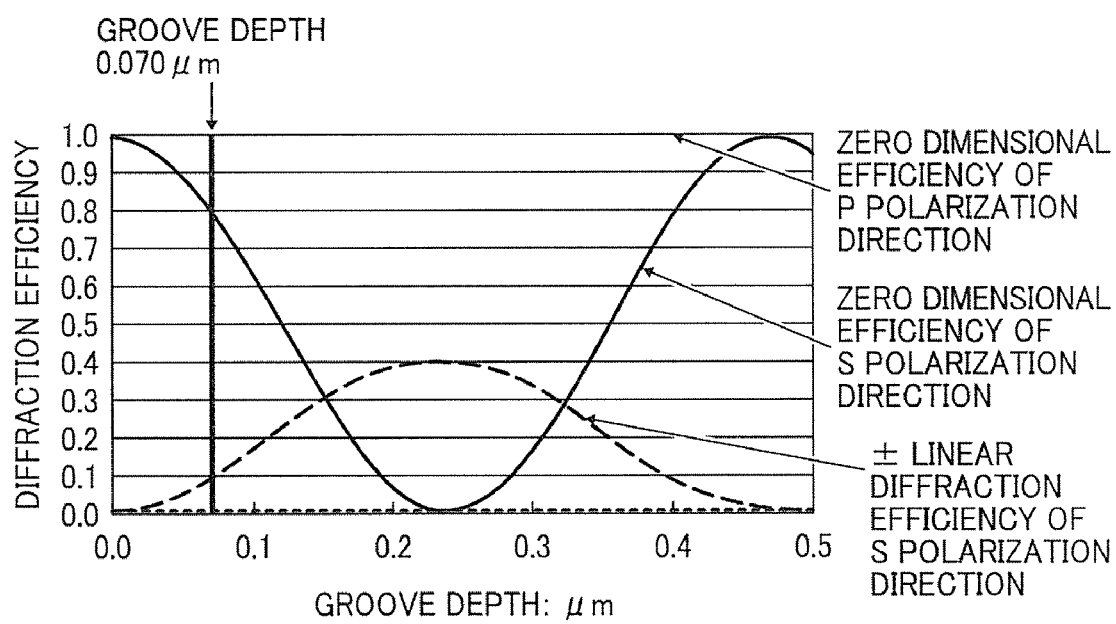

FIG. 18
(a)
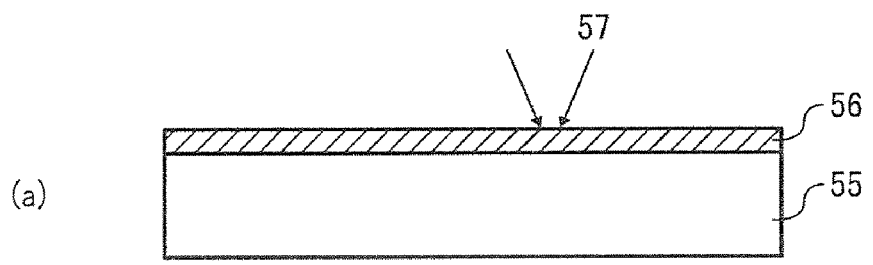
(b)
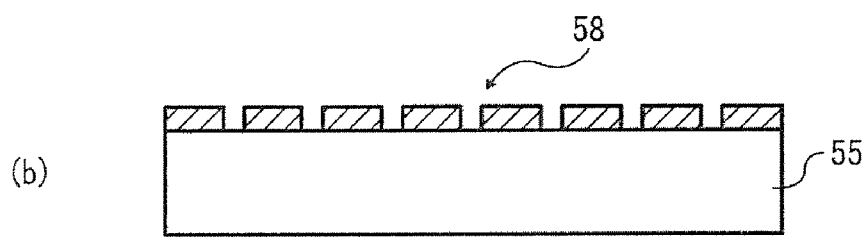
(c)
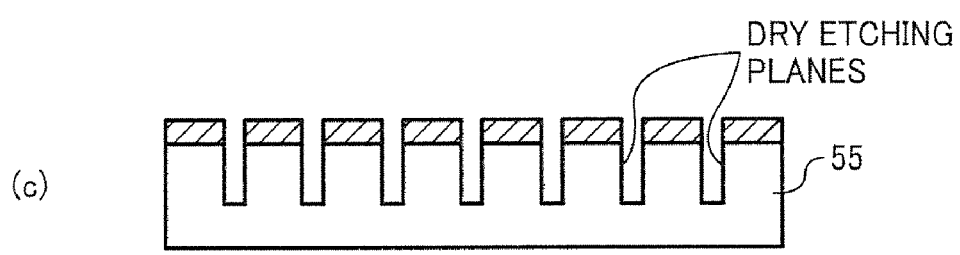
(d)
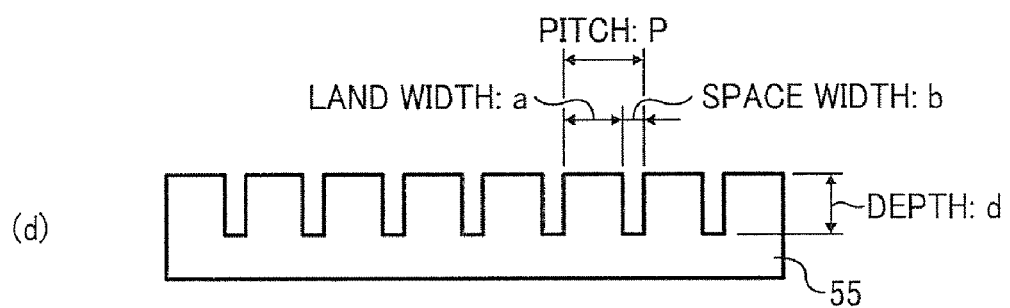

FIG. 19
(a)
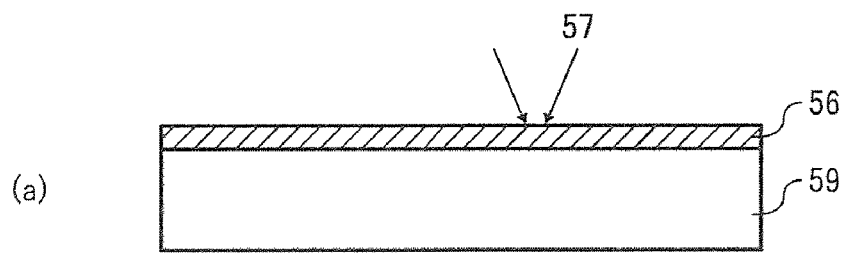
(b)
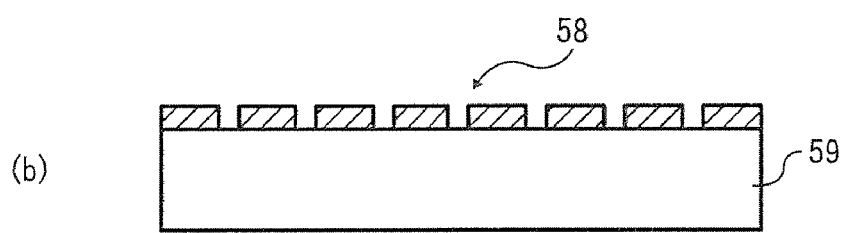
(c)
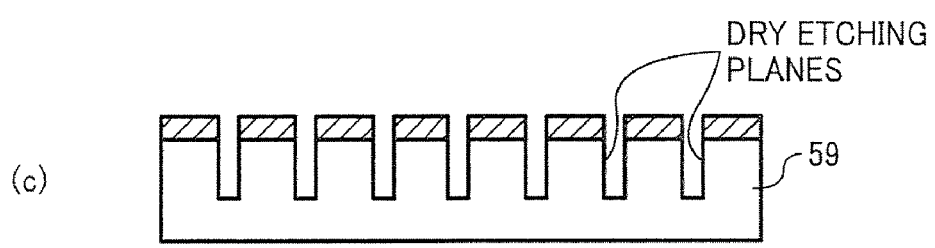
(d)
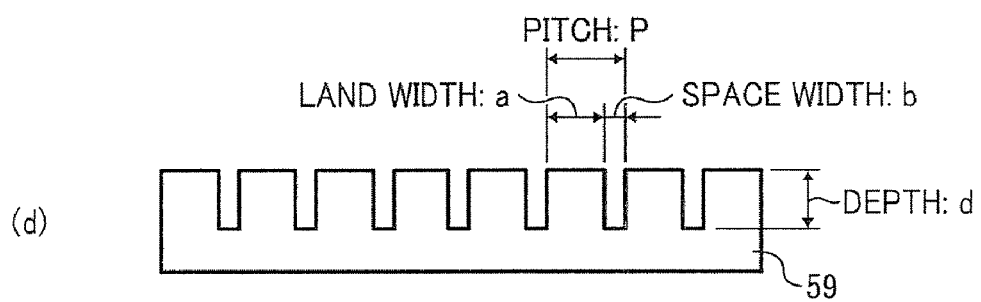

OPTICAL PICKUP AND OPTICAL DATA PROCESSING DEVICE USING THE SAME

BACKGROUND OF THE INVENTION

1. Field of the Invention

The present invention relates to an optical pickup including an optical element and more particularly to an optical pickup capable of obtaining suitable track error signals during reading and/or writing for multiple optical recording media having different track pitches, and an optical data processing device using the optical pickup.

2. Discussion of the Background

An optical pickup typically has a structure which detects focus error signals and track error signals and controls the position of an objective lens by using these error signals to correctly irradiate a predetermined recording track in an optical recording medium. With regard to the detection of track error signals, a 3-spot system, a push-pull system, and a differential push-pull system (hereinafter referred to as the DPP system or simply DPP) are typical well known examples.

In particular, the DPP system uses a relatively simple optical system with highly sensitive track error signal detection. In addition, the DPP system has an advantage in that it can detect relatively reliable track error signals in which any offset of the track error signals ascribable to displacement of the objective lens or tilt of the optical recording medium is suitably removed.

Track error signal detection using the DPP system is briefly described. An optical pickup which employs the DPP system includes, for example, a diffraction element 23 arranged between a semiconductor laser 1 as the light source and a half mirror 26 as illustrated in FIG. 24. The diffraction element 23 includes, for example, straight grooves engraved in the surface thereof at a constant pitch, that is, with a regular, uniform gap between the grooves as illustrated in FIG. 25, and has a function of splitting a light beam emitted from the semiconductor laser 1 by diffraction into at least three light beams, i.e., + or − one dimensional light beam, and zero dimensional light beam.

These three light beams are independently focused by way of the half mirror 26, a collimate lens 5, and an objective lens 29 to form three focus spots 100, 101, and 102 on the signal recording face of an optical recording medium 30 as illustrated in (a) of FIG. 26A. The irradiation positions of these three spots 100, 101, and 102 are adjusted by, for example, controlling the rotation of the diffraction element 23 around the optical axis such that an irradiation position interval δ in the radial direction of the optical recording medium 30, i.e., the direction perpendicular to a guiding groove 31 provided in a cyclical manner on the recording surface of the optical recording medium 30, is substantially equal to ½ of the pitch TP of the guide groove 31 (hereinafter, this guide groove pitch TP is referred to as track pitch). The reflected light beams from the focus spots 100, 101, and 102 on the optical recording medium 30 reach the objective lens 29, the collimate lens 5 and the half mirror 26 again. A portion of the reflected light beams transits the half mirror 26 and enters a light reception element 12 via a detection lens 11.

The light reception element 12 has reception portions 20a, 20b and 20c, which are three half- or quarter-reception portions. The reflected light beams of the optical recording medium 30 independently strike into the predetermined reception surfaces of the reception portions 20a, 20b, and 20c to form detection light spots 200, 201 and 202. The photo-electric conversion signals from these reception surfaces are subjected to subtraction treatment by subtractors 50a, 50b, and 50c to detect the track error signals (hereinafter referred to as push-pull signals) by the push-pull signal system.

The detected light spots corresponding to the main focus spot 100 and the sub focus spots 101 and 102 focused on the recording medium 30 are represented by the detected light spots 200, 201 and 202, respectively. The push-pull signals obtained from the detection spots 200, 201 and 202 are represented by Sa, Sb and Sc. From the relative positions of the focus spots 100, 101, and 102 on the optical recording medium 30, it is apparent that the push-pull signals Sa, on the one hand, and Sb and Sc on the other are about 180° out of from each other. With regard to the push-pull signals, Sa and Sb, and Sa and Sc, are output with the signal waveforms reversed (Sb and Sc are the same phase). Therefore, when the addition signal of the signals Sb and Sc is subtracted from the signal Sa, the signal component is not negated but on the contrary is amplified.

On the other hand, displacement of the objective lens 29 or tilt of the optical recording medium 30 causes a predetermined offset component in each push-pull signal. This offset component is obviously independent of the exact focus spot positions on the optical recording medium 30 and occurs to Sa, Sb, and Sc with the same polarity. Therefore, the offset components contained in each push-pull signal selectively cancel each other out in the subtraction treatment described above. As a result, only the offset component is completely removed or significantly reduced so that a good track error signal can be detected.

That is, for example, the push-pull signals Sb and Sc of (b) of FIG. 26 are added by an adder 51 and the signals thereafter are suitably amplified by an amplifier 52 followed by subtraction treatment from the push-pull signal Sa of the main optical spot 100 by a subtractor 53. Therefore, the offset component contained in the push-pull signal Sa is completely removed or significantly reduced, which leads to output of a suitably amplified track error signal.

As briefly described above, the DDP system can detect track error signals with a high degree of sensitivity by using a relatively simple detection optical system to completely remove or significantly reduce the offset component ascribable to the displacement of an objective lens or the tilt of an optical recording medium.

However, the DPP system involves the following practical disadvantages. As described above, the redial-direction irradiation position interval δ for the three focus light spots is required to be adjusted to ½ of the track pitch TP of the optical recording medium 30. Therefore, suitable track signal error signals are not detectable for the optical recording medium 30 having a track pitch Tp widely outside the range of double of the irradiation position interval δ of the focus light spots.

As increasingly popular optical recording media using a blue ray wavelength (λ=405 nm), for example, there are Blu-ray (hereinafter referred to as BD) optical recording media and HD-DVD (hereinafter referred to as HD) optical recording media; there is also a technology involving an optical pickup which is capable of playing both kinds of optical recording media. However, the track pitch of the BD optical recording media is about 0.32 μm while that of the HD optical recording medium is 0.40 μm. FIG. 27 is a schematic diagram illustrating the optical system of the technology to deal with these two different kinds of optical recording media. As shown in FIG. 27, the optical system has a structure in which one objective lens 9 for HD media focuses the light beam emitted from the blue color light source (semiconductor laser 1b) on an HD optical recording medium 10 and, another objective lens 14 for BD media, on an BD optical recording medium 15. A diffraction element 15 for DPP is located on the light path between the light source 1b and both objective lenses 9 and 14.

In this structure, the positional intervals between the three focus light spots which are adjusted to detect the optimal track error signals for an HD optical recording medium are not suitable for a BD optical recording medium, meaning that the track error signals are difficult to detect in the case of the BD optical recording medium by the DPP system. That is, suitably detecting the track error signals of optical recording media having different track pitches with one optical pickup using the DPP system is difficult, depending on the combination of optical recording media.

One plausible approach to dealing with this issue would be to provide another diffraction element for BD optical recording media on the upstream side of the diffraction element 24 while the diffraction element 24 is used for HD optical recording media. However, in this method, an unused sub-spot is formed on the optical recording medium so that the track error signals are not suitably detected.

As another method, a grating can be provided on the downstream side of a prism 25. However, arranging such a grating is not easy due to layout limitations.

SUMMARY OF THE INVENTION

Because of these reasons, the present inventor recognizes that a need exists for an optical pickup based on the DPP (differential push pull) system having a diffraction element by which tracking offset is suitably removed to obtain practical DPP signals for multiple kinds of optical recording media having different track pitches and an optical data processing device using the optical pickup.

Accordingly, an object of the present invention is to provide an optical pickup based on the DPP (differential push pull) system having a diffraction element by which tracking offset is suitably removed to obtain practical DPP signals for multiple kinds of optical recording media having different track pitches and an optical data processing device using the optical pickup.

Briefly this object and other objects of the present invention as hereinafter described will become more readily apparent and can be attained, either individually or in combination thereof, by an optical pickup including a light source, a first light focus device to focus light beam on the recording surface of a first optical recording medium, a second light focus device to focus a light beam on the recording surface of a second optical recording medium having a different track pitch from that of the first optical recording medium, a light reception device to receive a reflected light beam from the first optical recording medium and the second optical recording medium, a polarization selective light path splitting device provided between the light source and the first light focus device and the second light focus device to split an incident light beam incident to the first light focus device and the second light focus device depending on the polarization direction of the incident light beam, a polarization switching device provided between the light source and the polarization selective light path splitting device to switch the polarization direction of an outgoing light beam emitted from the light source depending on which one of the first optical recording medium or the second optical recording medium is targeted, a first diffraction element provided between the polarization selective light path splitting device and the polarization switching device to diffract a light beam having a polarization direction perpendicular to the polarization direction of the outgoing light beam emitted from the light source and a second diffraction element provided between the polarization selective light path splitting device and the polarization switching device to diffract light having a polarization direction parallel to the polarization direction of the outgoing light beam emitted from the light source. In the optical pickup, the first diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and the filling factors of the two kinds of sub-wavelength convexo-concave structures of the first diffraction element are determined to substantially equalize effective refractive indices of the two kinds of sub-wavelength convexo-concave structures of the first diffraction element with regard to the polarization direction of the outgoing light beam emitted from the light source. In addition, in the optical pickup, the second diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the second diffraction element are alternately arranged at right angles to each other, and the filling factors of the two kinds of sub-wavelength convexo-concave structures of the second diffraction element are determined to substantially equalize the effective refractive indices of the two kinds of sub-wavelength convexo-concave structure of the second diffraction element with regard to a polarization direction perpendicular to the polarization direction of the outgoing light beam emitted from the light source.

As another aspect of the present invention, an optical pickup is provided in which includes a light source, a first light focus device to focus a light beam on the recording surface of a first optical recording medium, a second light focus device to focus a light beam on the recording surface of a second optical recording medium having a different track pitch from that of the first optical recording medium, a light reception device to receive a reflected light beam from the first optical recording medium and the second optical recording medium, a polarization selective light path splitting device provided between the light source and the first light focus device and the second light focus device to split an incident light beam incident to the first light focus device and the second light focus device depending on the polarization direction of the incident light beam, a polarization switching device provided between the light source and the polarization selective light path splitting device to switch the polarization direction of an outgoing light beam emitted from the light source depending on which one of the first optical recording medium or the second optical recording medium is targeted and a diffraction element provided between the polarization selective light path splitting device and the polarization switching device, which includes a first area which diffracts a light beam having a polarization direction perpendicular to the polarization direction of the outgoing light beam emitted from the light source and a second area which diffracts a light beam having a polarization direction parallel to the polarization direction of the outgoing light beam emitted from the light source. In the optical pickup, the first area of the diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and the filling factors of the two kinds of sub-wavelength convexo-concave structures of the first diffraction element are determined to substantially equalize effective refractive indices of the two kinds of sub-wavelength convexo-concave structures of the first area with regard to the polarization direction of the outgoing light beam emitted from the light source. In addition, the second area of the diffraction element has a periodic structure having a pitch equal to or longer than a wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the second area are alternately arranged at right angles to each other, and the filling factors of the two kinds of sub-wavelength convexo-concave structures of the second diffraction element are determined to substantially equalize the effective refractive indices of the two kinds of sub-wavelength convexo-concave structures of the second area with regard to a polarization direction perpendicular to the polarization direction of the outgoing light beam emitted from the light source.

As another aspect of the present invention, an optical pickup is provided in which includes a light source, a first light focus device to focus a light beam on the recording surface of a first optical recording medium, a second light focus device to focus a light beam on the recording surface of a second optical recording medium having a different track pitch from that of the first optical recording medium, a light reception device to receive a reflected light beam from the first optical recording medium and the second optical recording medium, a polarization selective light path splitting device provided between the light source and the first light focus device and the second light focus device to split an incident light beam incident to the first light focus device and the second light focus device depending on the polarization direction of the incident light beam, a first diffraction element provided between the polarization selective light path splitting device and the light source to diffract a light beam having a polarization direction forming an angle of −45° with respect to the polarization direction of an outgoing light beam emitted from the light source, and a second diffraction element provided between the polarization selective light path splitting device and the light source to diffract a light beam having a polarization direction forming an angle of +45° with respect to the polarization direction of the outgoing light beam emitted from the light source. In the image pickup, the first diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and the filling factors of the two kinds of sub-wavelength convexo-concave structures of the first diffraction element are determined to substantially equalize effective refractive indices of the two kinds of sub-wavelength convexo-concave structures of the first diffraction element with regard to the polarization direction forming an angle of +45° to the outgoing light beam emitted from the light source. In addition, the second diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the second diffraction element are alternately arranged at right angles to each other, and the filling factors of the two kinds of sub-wavelength convexo-concave structures of the second diffraction element are determined to substantially equalize the effective refractive indices of the two kinds of sub-wavelength convexo-concave structure of the second diffraction element with regard to a polarization direction forming an angle of −45° to the outgoing light beam emitted from the light source.

As another aspect of the present invention, an optical pickup is provided in which includes a light source, a first light focus device to focus a light beam on the recording surface of a first optical recording medium, a second light focus device to focus a light beam on the recording surface of a second optical recording medium having a different track pitch from that of the first optical recording medium, a light reception device to receive a reflected light beam from the first optical recording medium and the second optical recording medium, a polarization selective light path splitting device provided between the light source and the first light focus device and the second light focus device to split an incident light beam incident to the first light focus device and the second light focus device depending on the polarization direction of the incident light beam, and a diffraction element provided between the polarization selective light path splitting device and the light source, which includes a first area which diffracts a light beam having a polarization direction forming an angle of −45° with respect to the polarization direction of the outgoing light beam emitted from the light source and a second area which diffracts a light beam having a polarization direction forming a polarization direction having an angle of +45° with respect to the polarization direction of the outgoing light beam emitted from the light source. In the image pickup, the light source is provided such that the polarization direction of the outgoing light beam emitted from the light source forms +45° with respect to the polarization selection direction of the polarization selective light path splitting device. In addition, the first area of the diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and the filling factors of the two kinds of sub-wavelength convexo-concave structures of the first diffraction element are determined to substantially equalize effective refractive indices of the two kinds of sub-wavelength convexo-concave structures of the first area with regard to a polarization direction forming +45° with respect to the polarization direction of the outgoing light beam emitted from the light source. Furthermore, the second area of the diffraction element has a periodic structure having a pitch equal to or longer than the wavelength of the outgoing light beam emitted from the light source, the periodic structure includes two kinds of sub-wavelength convexo-concave structures having respective pitches shorter than the wavelength of the outgoing light beam emitted from the light source while the two kinds of sub-wavelength convexo-concave structures of the second area are alternately arranged at right angles to each other, and the filling factors of the two kinds of sub-wavelength convexo-concave structures of the second diffraction element are determined to substantially equalize the effective refractive indices of the two kinds of sub-wavelength convexo-concave structures of the second area with regard to a polarization direction forming −45° with respect to the polarization direction of the outgoing light beam emitted from the light source.

As another aspect of the present invention, an optical data processing device is provided which includes a spindle motor, a servo control circuit, a system controller and the optical pickup described above.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 2 is an elevation view illustrating a macro structure of an HD diffraction element, a cross section thereof, an elevation view illustrating a macro structure of a BD diffraction element, and a cross section thereof;

FIG. 4A is a diagram illustrating a state in which a light beam of P polarization component and of S polarization component enter the HD diffraction element and FIG. 4B is a diagram illustrating a state in which a light beam of P polarization component and of S polarization component enter the BD diffraction element;

FIG. 7A is a diagram illustrating a diffraction angle of an HD optical recording medium of Example 1 described later at playing and FIG. 7B is a diagram illustrating a diffraction angle of a BD optical recording medium of Example 1 described later at playing;

FIG. 8A is an elevation view of a diffraction element having diffraction lattice planes on both sides viewed from the HD diffraction element side, FIG. 8B is a cross section of the diffraction element and FIG. 8C is an elevation view of the diffraction element viewed from the BD diffraction element side;

FIG. 12A is a diagram illustrating a diffraction angle of the diffraction element when playing an HD optical recording medium, and FIG. 12B is a diagram illustrating a diffraction angle of the diffraction element when playing a BD optical recording medium;

FIG. 14A is a perspective view illustrating S polarization direction and P polarization direction when the polarization direction of the light source is rotated 45 degrees and FIG. 14B is a diagram illustrating diffraction of the diffraction element;

FIG. 17A is a graph illustrating the zero dimensional transmission ratio and one dimensional diffraction efficiency when a light beam enters the HD diffraction element, and FIG. 17B is a graph illustrating the zero dimensional transmission ratio and one dimensional diffraction efficiency when a light beam enters the BD diffraction element;

FIGS. 18A to 18D are process drawings illustrating a method of manufacturing a mold formed of quartz as basal material;

FIGS. 19A to 19D are process drawings illustrating a method of manufacturing a mold formed of silicon as basal material;

DETAILED DESCRIPTION OF THE INVENTION

The present invention will be described below in detail with reference to several embodiments and accompanying drawings.

Embodiment 1

Figure 1:
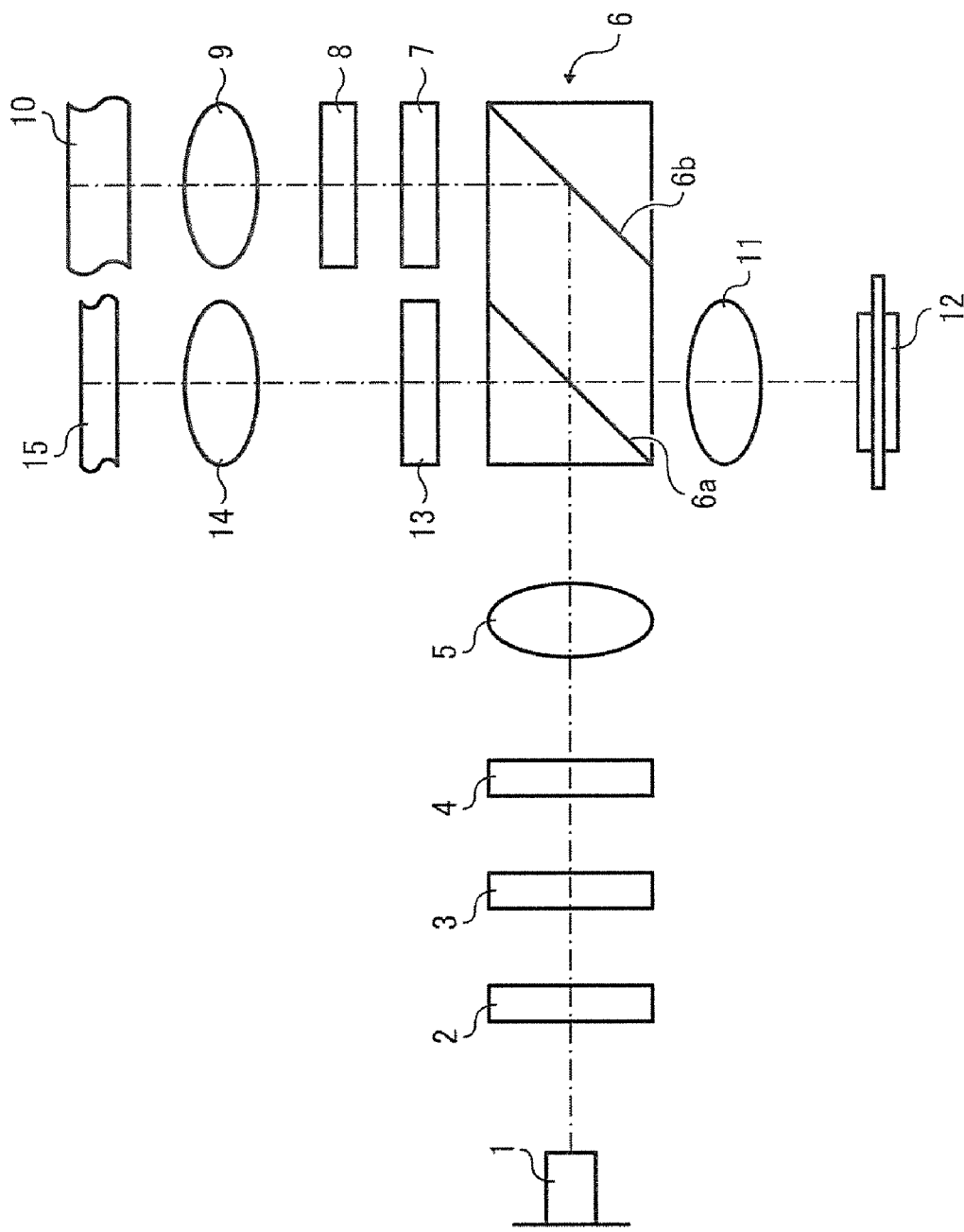
FIG. 1 is a diagram illustrating an example of the optical pickup having a liquid crystal element and two diffraction elements of polarization selection type of Example 1 described later of the present invention.

FIG. 1 is a schematic diagram illustrating an embodiment of the structure of the optical pick up having a liquid crystal element and two diffraction elements of a polarization selection type of the present invention. In FIG. 1, a numeral reference 1 represents a semiconductor laser as a light source; a numeral reference 2 represents a liquid crystal element as a polarization switching device; a numeral reference 3 represents an HD diffraction element for 3 beams for an HD-DVD (hereinafter referred to as HD) as a first diffraction element, a numeral reference 4 represents a BD diffraction element for 3 beams for a Blu-ray disc (hereinafter referred to as BD) as a second diffraction element; a numeral reference 5 represents a collimate lens; a numeral reference 6 represents a light path splitting device of a polarization selection type (i.e., a polarization selective light path splitting device); a numeral reference 6a represents a polarization beam splitter surface; a numeral reference 6b represents a reflection mirror surface; a numeral reference 7 represents a ½ wavelength board; a numeral reference 8 represents a ¼ wavelength board; a numeral reference 9 represents an objective lens for an HD as a first light focus device; a numeral reference 10 represents an HD optical recording medium; a numeral reference 11 represents a detection lens; a numeral reference 12 represents a light reception element (device); a numeral reference 13 represents a ¼ wavelength board; a numeral reference 14 represents an objective lens for a BD as a second light focus device; and a numeral reference 15 represents a BD optical recording medium. In this structure, the collimate lens 5, the ½ wavelength board 7, the ¼ wavelength boards 8 and 13 and the detection lens 11 are optional. The following is described about the structure having all the optional devices and elements.

Below are descriptions about each light path. For convenience, the polarization direction perpendicular to the sheet is referred to as S polarization while the polarization direction parallel to the sheet is referred to as P polarization. In Embodiment 1, the semiconductor laser 1 is arranged to emit the light beam having an S polarization component.

The semiconductor laser 1 of FIG. 1 emits light beams having a wavelength (e.g., 405 nm) in the blue color wavelength band which satisfies the specification of the BD optical recording medium 15 and the HD optical recording medium 10.

The liquid crystal element 2 is a polarization switching device which selectively generates the phase difference by the polarization of incident light beam and the electric power source driving. That is, when the liquid crystal element 2 is powered on, a light beam having a polarization advancing from the semiconductor 1 side to the optical recording medium side is converted. For example, an S polarization light is converted to a P polarization light by creating a phase difference corresponding to a ½ wavelength. When the liquid crystal element 2 is powered off, the liquid crystal element 2 transmits an incident light beam without creating a phase difference irrespective of the polarization of the incident light beam.

The HD diffraction element 3 as the first light focus device splits the light beam emitted from the semiconductor laser 1 into a zero dimensional light beam (main light beam) and + or − one dimensional light beam (sub-light beams) to detect track error signals by the 3 beam method or the DPP (differential push pull) system. Thus, play signals are obtained by the detection signals of zero dimensional light reflected on the HD optical recording medium 10 and the track error signals are obtained by calculation of the detection signals of the zero dimensional light beam and + or − one dimensional light beam reflected on the HD optical recording medium 10.

The BD diffraction element 4 as the second light focus device splits the light beam emitted from the semiconductor laser 1 into a zero dimensional light beam (main light beam) and + or − one dimensional light beam (sub-light beams) to detect track error signals by the 3 beam method or the DPP (differential push pull) system. Thus, play signals are obtained by the detection signals of zero dimensional light reflected on the BD optical recording medium 15 and the track error signals are obtained by calculation of the detection signals of the zero dimensional light beam and + or − one dimensional light beam reflected on the BD optical recording medium 15.

The collimate lens 5 converts a diversion incident light beam emitted from the semiconductor laser 1 into a parallel light beam.

The light path splitting device 6 as the polarization selective light path splitting device includes the polarization beam splitter surface 6a and the reflection mirror surface 6b. The polarization beam splitter surface 6a is formed of laminar layers through which the light beam of P polarization component transmits and by which the light beam of S polarization component is reflected. The reflection mirror 6b is a mirror to which a reflection layer is deposited and converts the light path by 90 degrees.

The ½ wavelength board 7 imparts an optical phase difference corresponding to a ½ wavelength to an incident light beam. For example, the ½ wavelength board 7 converts an incident beam of P polarization direction into a reflected light beam of S polarization direction or an incident beam of S polarization direction into a reflected light beam of P polarization direction.

The ¼ wavelength board 8 is provided between the polarization splitter surface 6a and the objective lens 9 to satisfy a high efficiency demand for an optical recording system and used as a device to change the polarization of an incident light beam. To be specific, the ¼ wavelength board 8 imparts the optical phase difference corresponding to a ¼ wavelength to an incident light beam. Thus, an incident light beam that has a linear polarization is converted into a circular polarization, and an incident light beam that has a circular polarization is converted into a linear polarization.

The objective lens 9 for HD as the first light focus device has a numeric aperture satisfying the specification of the HD optical recording medium 10, i.e., about 0.65.

The HD optical recording medium 10 is an optical recording medium having a data recording surface on which a guide groove having a track pitch of 0.40 μm is formed. This HD optical recording medium 10 is, for example, a double layer optical recording medium having data recording surfaces L1 and L2 from the objective lens side.

The detection lens 11 is a lens to focus the reflected light from each optical recording medium to the light reception element 12.

The light reception element 12 detects data signals and/or error signals by receiving a light beam reflected from the optical recording medium 10 or 15.

The ¼ wavelength board 13 is provided between the polarization beam splitter surface 6a and the objective lens 14 to satisfy a high efficiency demand for an optical recording system and used as a device to change the polarization of an incident light beam. To be specific, the ¼ wavelength board 13 imparts an optical phase difference corresponding to a ¼ wavelength to an incident light beam. Thus, an incident light beam that has a linear polarization is converted into a circular polarization, and an incident light beam that has a circular polarization is converted into a linear polarization.

The objective lens 14 for BD as the second light focus device has a numeric aperture satisfying the specification of the BD optical recording medium 15, i.e., about 0.85.

The BD optical recording medium 15 is an optical recording medium having a data recording surface on which a guide groove having a track pitch of 0.32 μm is formed.

The optical pickup of Embodiment 1 has an optical system to focus a light beam on the HD optical recording medium 10 and another optical system to focus a light beam on the BD optical recording medium 15. The semiconductor 1 and the light reception element 12 are shared in both systems.

The diversion light beam having a wavelength on the 405 nm band, which is a linear polarization light beam of S polarization component, is emitted from the semiconductor laser 1 and the light beam of S polarization component is converted into the linear polarization light beam of P polarization component by the liquid crystal element 2 which functions as a switching element of P polarization and S polarization in the light path (outward path) of the HD optical system. The diversion incident light beam is diffracted at the HD diffraction element 3 into three light beams, then not diffracted at the BD diffraction element 4 and then collimated at the collimate lens 5. The light beam of P polarization passes through the polarization beam splitter surface 6a of the light path splitting device 6 and reflected at the reflection mirror surface 6b so that the light path is deflected by 90 degrees. The ½ wavelength board 7 changes the phase by 90 degrees to convert into a light beam of S polarization component and the ¼ wavelength board 8 converts the light beam into circular polarization. Then the objective lens 9 for HD focuses the light beam on the signal recording layer of the HD optical recording medium 10.

In addition, in the return path, the reflected light from the HD optical recording medium 10 advances in the reversed way to the outward path. That is, the light beam is converted into the light beam of P polarization component at the ¼ wavelength board 8; converted into the light beam of S polarization component at the ½ wavelength board 7; reflected at the reflection mirror 6b of the light path splitting device 6; reflected at the polarization beam splitter surface 6a which reflects the light beam of S polarization component so that the light path is deflected by 90 degrees; and received at the light reception element 12 via the detection lens 11.

Next, the diversion light beam having a wavelength on the 405 nm band, which is a linear polarization light beam of S polarization component, is emitted from the semiconductor laser 1 and the light beam of S polarization component passes through the liquid crystal element 2 which functions as a switching element of P polarization and S polarization in the light path (outward path) of the BD optical system. The diversion incident light beam is not diffracted at the HD diffraction element 3, but split (diffracted) at the BD diffraction element 4 into 3 beams and then collimated at the collimate lens 5. The light beam of S polarization is reflected by the polarization beam splitter surface 6a of the light path splitting device 6 so that the light path is deflected by 90 degrees. The ¼ wavelength board 13 converts the light beam into circular polarization. Then, the objective lens 14 for BD focuses the light beam on the signal recording layer of the BD optical recording medium 15.

In addition, in the return path, the reflected light from the BD optical recording medium 15 advances in the reversed way to the outward path. That is, the light beam is converted into the light beam of P polarization component at the ¼ wavelength board 13; passes through the polarization beam splitter surface 6a through which the light beam of P polarization component transmits; and is received at the light reception element 12 via the detection lens 11.

FIG. 2 is diagrams illustrating a macro structure of the HD diffraction element and the BD diffraction element. In FIG. 2, (a) and (b) are a diagram of the HD diffraction element viewed from the light source side and a cross section thereof and (c) and (D) are a diagram of the BD diffraction element viewed from the light source side and a cross section thereof.

The HD diffraction element 3 has a lattice plane (grating) which diffracts the light beam of P polarization component and transmits the light beam of S polarization component. To the contrary, the BD diffraction element 4 has a lattice plane (grating) which transmits the light beam of P polarization component and reflects the light beam of S polarization component.

In FIG. 1, the HD diffraction element 3 and the BD diffraction element 4 are provided in which both lattice places are facing to the light source 1.

The direction of the periodic lattice (grating) formed in the HD diffraction element 3 and the direction of the periodic lattice formed in the BD diffraction element 4 form a predetermined angle θ1 and θ2, respectively, with the direction of S polarization.

Figure 3A:
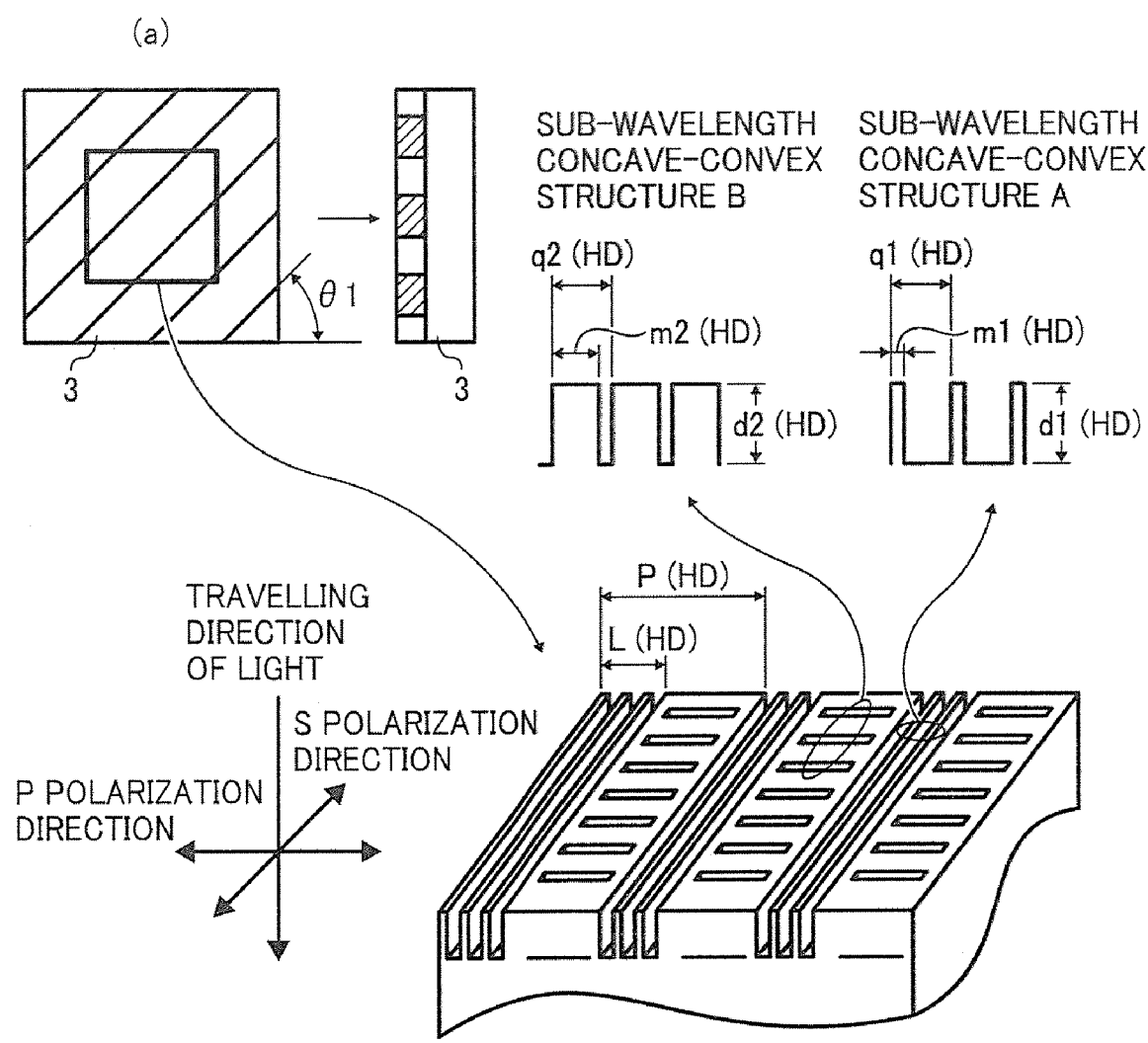
FIG. 3A is a perspective view of the HD diffraction element with an enlarged view of the lattice formed on the HD diffraction element.
Figure 3B:
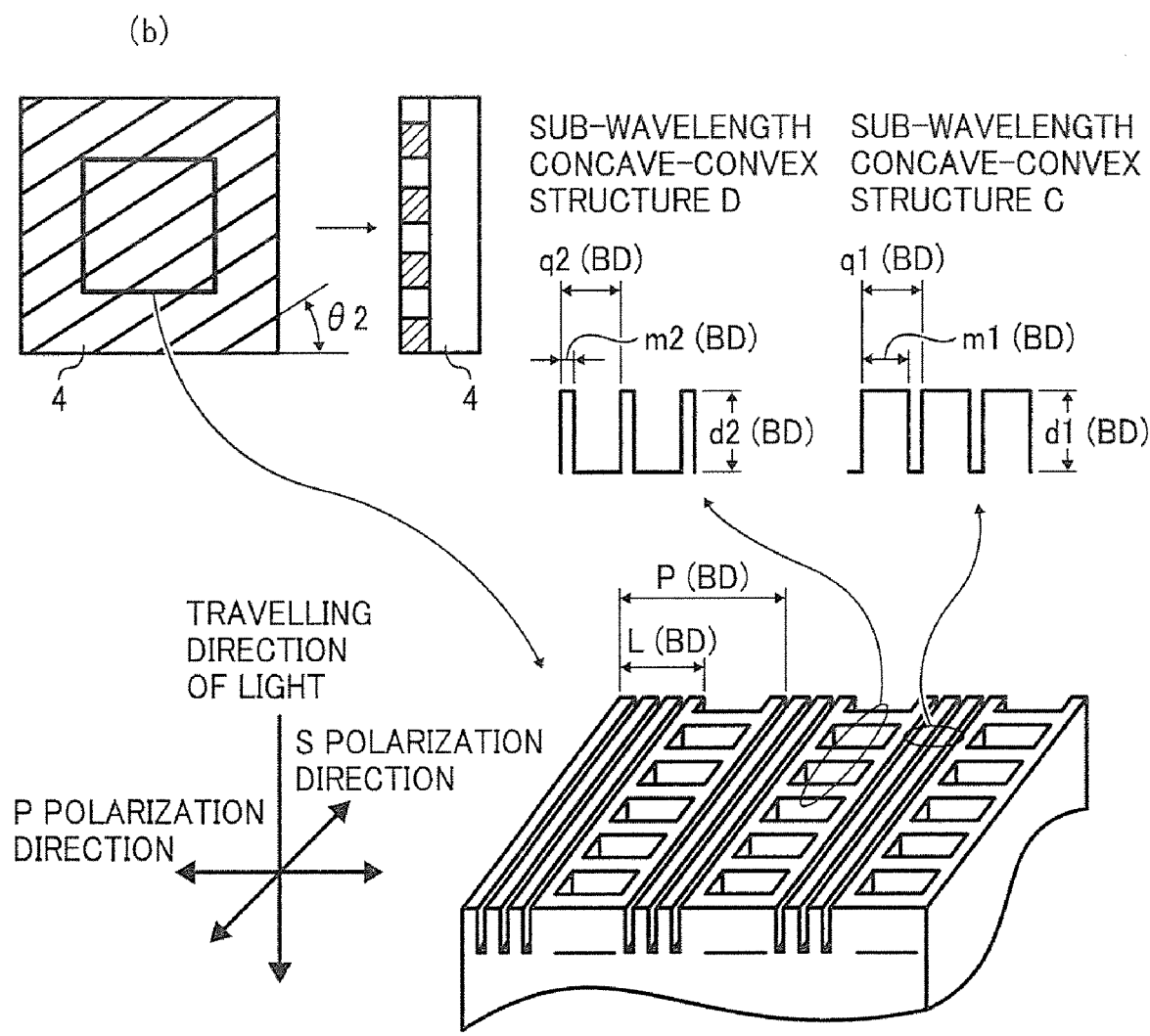
FIG. 3B is a perspective view of the BD diffraction element with an enlarged view of the lattice formed on the BD diffraction element.

FIGS. 3A and 3B are enlarged perspective views of the lattices (gratings) formed in the HD diffraction element and the BD diffraction element and illustrate an amount of 3 pitches with regard to a pitch having a wavelength longer than that of the outgoing light beam emitted from the semiconductor laser 1, which is formed on the HD diffraction element 3 and the BD diffraction element 4. FIG. 3A is an enlarged view on the diffraction element for 3 beams for HD. FIG. 3B is an enlarged view on the diffraction element for 3 beams for BD.

As illustrated in FIG. 3A, the HD diffraction element 3 has a periodic structure having a pitch P(HD) equal to or longer than the wavelength of an incident light beam which includes two kinds of sub-wavelength convexo-concave structures having a pitch q1(HD) and a pitch q2(HD) which are shorter than the wavelength of the incident light beam. The two sub-wavelength convexo-concave structures are alternately arranged and adjacent and perpendicular to each structure. The incident light beam is diffracted by the periodic structure having a pitch equal to or longer than the wavelength of the incident light beam and the sub-wavelength convexo-concave structures determine which polarization component, i.e., P polarization component or S polarization component, is diffracted. Therefore, as illustrated in FIG. 4A, the HD diffraction element 3 diffracts a light beam of P polarization component and transmits a light beam of S polarization component in a dead-band manner.

Similarly, as illustrated in FIG. 3B, the BD diffraction element 4 has a periodic structure having a pitch P(BD) equal to or longer than the wavelength of an incident light beam which includes two kinds of sub-wavelength convexo-concave structures having a pitch q1(BD) and a pitch q2(BD) which are shorter than the wavelength of the incident light beam. The two sub-wavelength convexo-concave structures are alternately arranged and adjacent and perpendicular to each structure. The incident light beam is diffracted by the periodic structure having a pitch equal to or longer than the wavelength of the incident light beam and the sub-wavelength convexo-concave structures determine which polarization component, i.e., P polarization component or S polarization component, is diffracted. Therefore, as illustrated in FIG. 4B, the BD diffraction element 4 diffracts a light beam having an S polarization component and transmits a light beam having a P polarization component in a dead-band manner.

Figure 5:
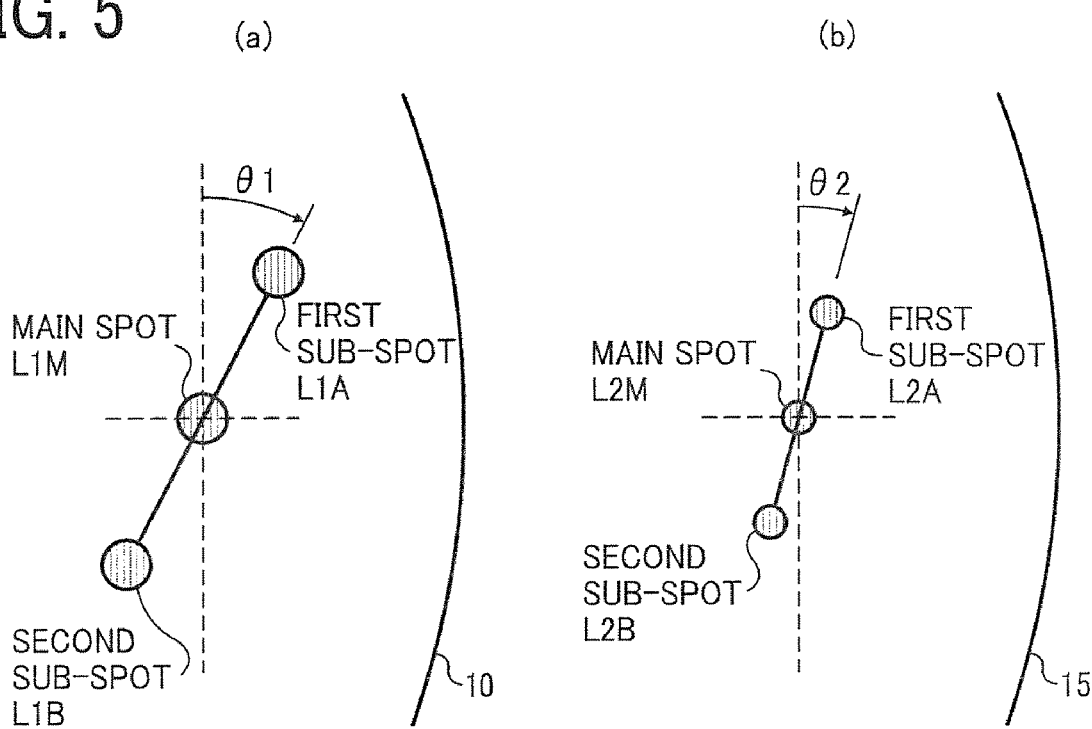
FIGS. 5A and 5B are diagrams illustrating spot positions of a laser beam on different kinds of optical recording media.

In addition, FIGS. 5A and 5B are diagrams illustrating the spot positions of the laser beams to play (read) and/or record different kinds of optical recording media. FIG. 5A is a diagram illustrating the spot positions of the laser beams to play an HD optical recording medium and FIG. 5B is a diagram illustrating the spot positions of the laser beams to play a BD optical recording medium.

The spot position of the three laser beams to play the HD optical recording medium 10 are a main spot L1M, a first sub-spot L1A located on the upper right hand side and a second sub-spot L1B located on the lower left hand side related to the main spot L1M.

The spot position of the three laser beams required to play the BD optical recording medium 15 are a main spot L2M, a first sub-spot L2A located on the upper right hand side and a second sub-spot L2B located on the lower left hand side related to the main spot L2M.

The centers of both main spots L1M and L2M are on the same position but the corresponding sub-spots thereto are on different positions reflecting the difference between the track pitches of both optical recording media. The sub-spots L2A and L2B of the BD optical recording medium 15 are out of the positions of the sub-spots L1A and L1B of the HD optical recording medium 10. This tilt angle θ is represented in an angle around the optical axis of (θ1-θ2).

The angle θ1 of the periodic lattice (grating) of the HD diffraction element 3 and the angle θ2 of the periodic lattice of the BD diffraction element 4 are determined based on this tilt angle θ. Therefore, each of laser beams L1 and L2 that have passed through the HD diffraction elements 3 and the BD diffraction elements 4 forms light spots on suitable positions on the HD optical recording medium 10 and the BD optical recording medium 15, respectively.

Figure 6:
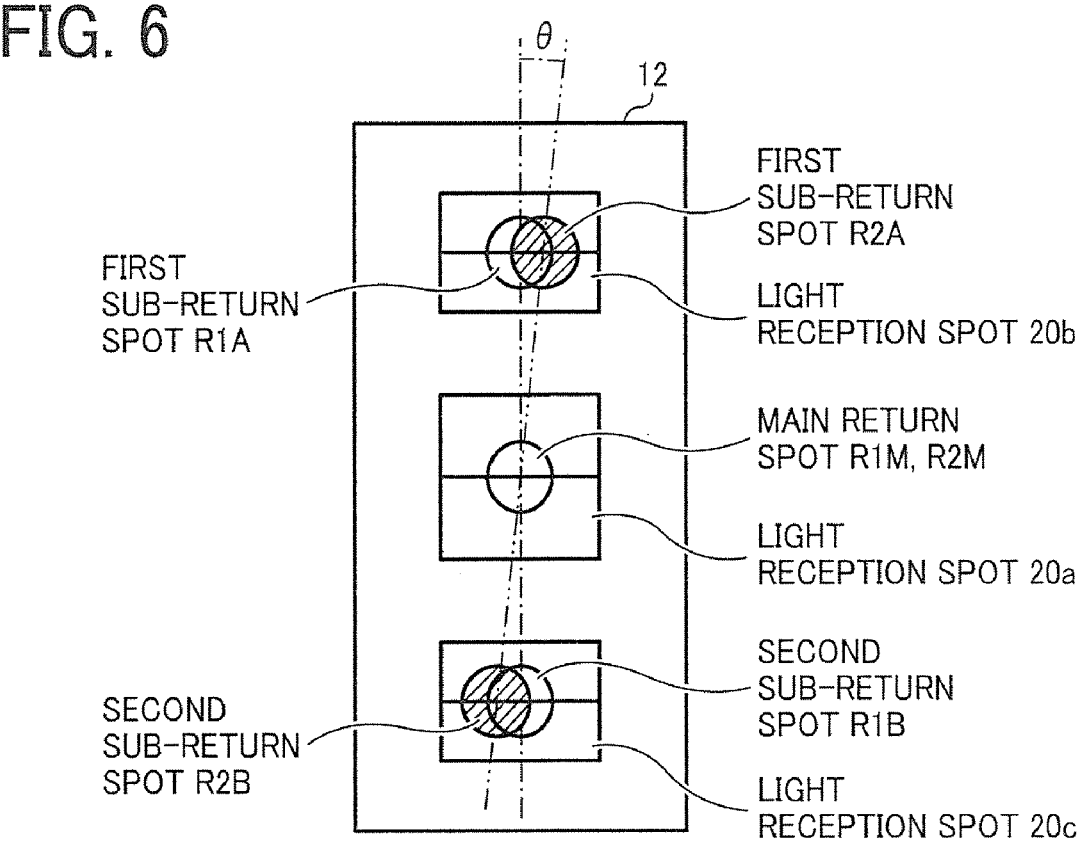
FIG. 6 is a diagram illustrating a light reception element which receives a return light beam from different kinds of optical recording media.

FIG. 6 is a diagram illustrating a light reception element to receive light returned from different kinds of the optical recording media. In FIG. 6, 20a represents a main light reception portion of a quarter division type and 20b and 20c represent sub-light reception portions of a half division type.

As described above, the spot formation position of the three beams formed on the light reception surface of the light reception element 12 is adjustable. As illustrated in FIG. 6, the light reception element 12 which employs the DPP (differential push pull) system includes the main light reception 20a of a quarter division type to receive the main laser beam among the three return beams and two sub-light reception portions 20b and 20c of a half division type to receive the two sub-laser beams. Main return light beams (spots) R1M and R2M in the return laser beams from the HD optical recording medium 10 and the BD optical recording medium 15 are focused on the main light reception portion 20a and the first sub-return light beams (spots) R1A and R2A and the second sub-return light beams (spots) R1B and R2B are focused on the sub-light reception portion 20b and 20c, respectively.

When the position of the light reception 12 is adjusted to the center of the main return spots R1m and R2M of the laser beams, the first sub-return spot R2A and the second sub-return spot R2B are received on the light reception element 8 with the tilt angle θ(=θ1-θ2) around the optical axis related to the first sub-return spot R1A and the second sub-return spot R2A. This tilt angle θ(=θ1-θ2) is equal to the angle difference between the lattice (grating) direction of the HD diffraction element 3 and the lattice (grating) direction of the BD diffraction element 4.

FIG. 7 is a diagram illustrating the diffraction angle of the diffraction element for use in Embodiment 1. The reference symbol α represents the diffraction angle of the laser beam by the HD diffraction element 3 and the reference symbol β represents the diffraction angle of the laser beam by the BD diffraction element 4.

As illustrated in FIG. 7, the HD diffraction element 3 diffracts the laser beam of P polarization component at a diffraction angle α and the BD diffraction element 4 diffracts the laser beam of S polarization component at a diffraction angle β. These diffraction angles α and β are calculated by the values satisfying the following relationships (1):

$$\mathrm{Sin}(\alpha) = \frac{\lambda}{P(HD)} \qquad \text{Relationship (1)}$$
$$\mathrm{Sin}(\beta) = \frac{\lambda}{P(BD)}$$

In Relationship (1), λ represents the wavelength of the outward laser beam emitted from the semiconductor laser 1, P(HD) represents the pitch of the HD diffraction element 3 which is longer than λ, and P(BD) represents the pitch of the BD diffraction element 4 which is longer than λ.

P(HD) and P(BD) are determined in such a manner that the sub-beams are focused on predetermined positions on the HD optical recording medium 10 and the sub-beams are focused on predetermined positions on the BD optical recording medium 15, respectively.

Generally, diffraction elements for 3 beams for use in an optical pickup is set to have a ratio of the + or − one dimension diffraction efficiency to the zero dimensional transmission ratio ranging from about 0.05 to about 0.30.

When the difference between the diffraction efficiency of the HD diffraction element 3 and of the BD diffraction element 4 is significant, the gain adjustment of the light reception element 12 tends to be difficult and the light amount of the sub-beams tends to be excessively small so that the noise increases, which leads to deterioration of recording and playing properties.

In addition, when the intensity of the sub-beam is too strong, the intensity of the main beam tends to decrease, resulting in reduction of the power to record. Therefore, a semiconductor laser having a high output power is required. In addition, even the sub-beam may record information on an optical recording medium, which causes deterioration of the recording characteristics.

The HD diffraction element 3 and the BD diffraction element 4 of Embodiment 1 can be combined in a single diffraction element which has grating faces on both sides as illustrated in FIG. 8. Thereby, the number of parts and processes can be reduced, which leads to cost reduction.

Furthermore, the polarization switching device is not limited to the liquid crystal element 2 illustrated in FIG. 1. For example, there is a method in which a ½ wavelength board that imparts an optical phase difference of a ½ wavelength is provided and the optical axis thereof is mechanically rotated.

In this structure, the polarization direction of the outgoing light beam emitted from the light source 1 is switched by the polarization switching device 2 and the light path thereof is split by the polarization selective light path splitting device 6. To focus a light beam having a certain polarization component on the first optical recording medium 10, and the light beam having the other polarization component perpendicular to the certain polarization component on the second optical recording medium 15, the first diffraction element 3 provided on the upstream side relative to the polarization selective light path splitting device 6 performs 3 beam diffraction only when the light beam having a certain polarization enters into the first diffraction element 3 and the second diffraction element 4 also provided on the upstream side relative to the polarization selective light path splitting device 6 performs 3 beam diffraction only when the light beam having the other polarization component perpendicular to the certain polarization component enters into the second diffraction element 4. Therefore, 3 beams corresponding to each optical recording medium are generated without transmission loss.

Embodiment 2

Figure 9:
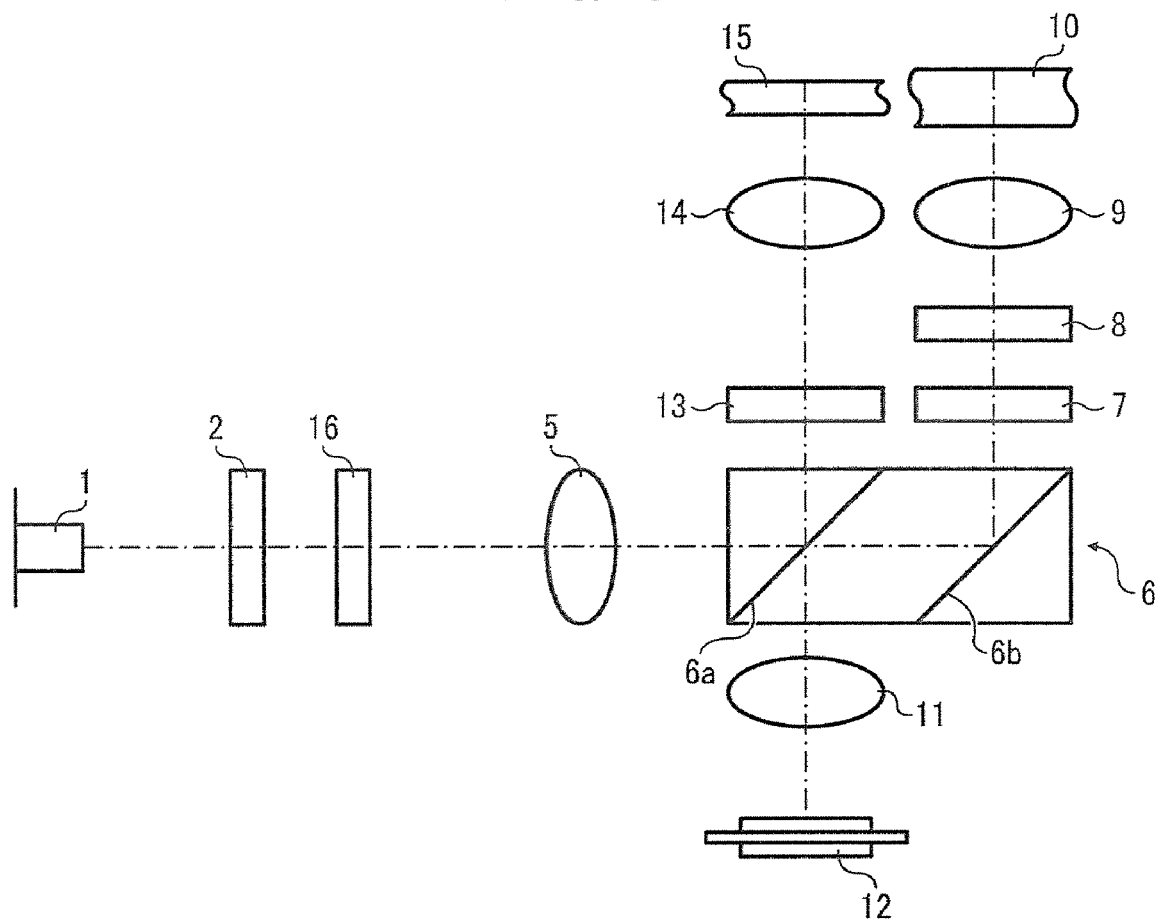
FIG. 9 is a schematic diagram illustrating an optical pickup having a liquid crystal element and a diffraction element of an area division type and a polarization selection type of Example 2 described later.

FIG. 9 is a schematic diagram illustrating an optical pickup of Embodiment 2 having a liquid crystal and a diffraction element of an area separation type and a polarization selection type. As illustrated in FIG. 9, the difference between the optical pickup described in Embodiment 1 and the optical pickup of Embodiment 2 is that the HD diffraction element 3 and the BD diffraction element 4 for 3 beams are replaced with a diffraction element 16 for 3 beams. As in the case of Embodiment 1, in this structure, the collimate lens 5, the ½ wavelength board 7, the ¼ wavelength boards 8 and 13 and the detection lens 11 are optional. The following is described about the structure having all the optional devices and elements.

Figure 10:
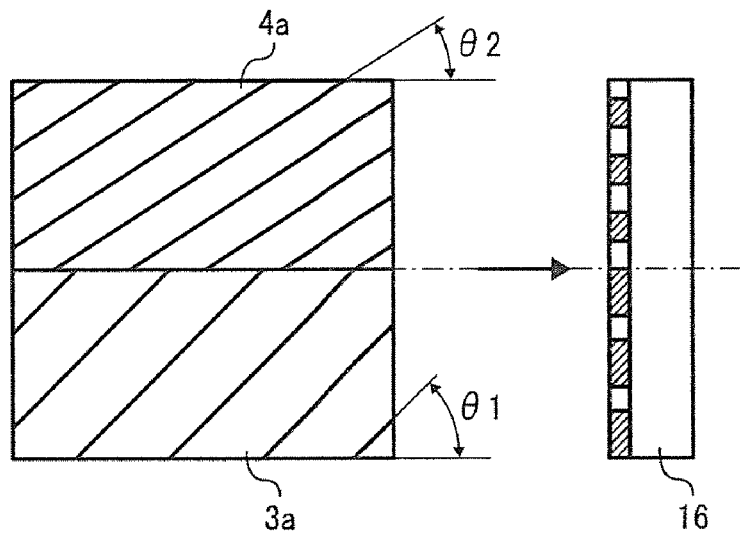
FIG. 10A is an elevation view illustrating a macro structure of the diffraction element and FIG. 10B is a cross section illustrating a macrostructure thereof.

In addition, (a) and (b) in FIG. 10 are diagrams illustrating the macro structure of the diffraction element 16. (a) is a diagram of the diffraction element 16 viewed from the light source side and (b) represents a cross section thereof. The diffraction element 16 is divided into two areas formed of a BD diffraction area 3a and an HD diffraction area 4a.

The HD diffraction area 3a has a lattice (grating) plane which diffracts a light beam of P polarization component and transmits the light beam of S polarization. By contrast, the BD diffraction area 4a has a lattice plane which transmits a light beam of P polarization component and diffracts the light beam of S polarization component.

In FIG. 10, the HD diffraction area 3a and the BD diffraction area 4a are arranged in such a manner that the diffraction element planes face the light source 1. In addition, the direction of the periodic lattice formed on the HD diffraction area 3a and the direction of the periodic lattice formed on the BD diffraction area 4a form predetermined angles of θ and θ2, respectively, with S polarization direction.

Figure 11:
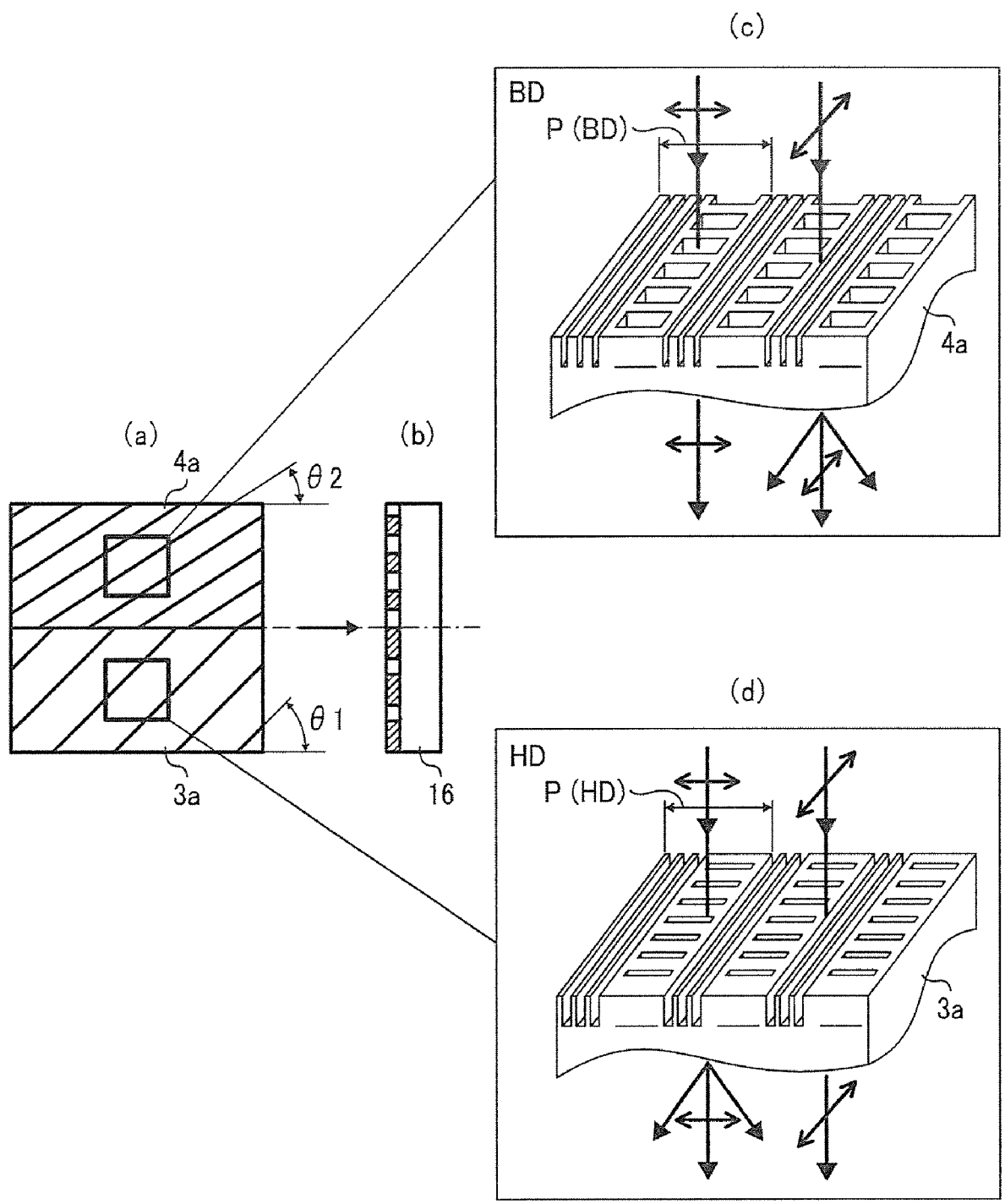
FIG. 11A is an elevation view illustrating the diffraction structure of the diffraction element.
FIG. 11B is a cross section illustrating the diffraction structure thereof.
FIG. 11C is an enlarged perspective view illustrating the diffraction structure thereof from the BD diffraction element side.
FIG. 11D is an enlarged perspective view illustrating the diffraction structure thereof from the HD diffraction element side.

In (a), (b), (c) and (d) of FIG. 11 illustrating the diffraction structure of the diffraction element 16, (a) and (b) of FIG. 11 are equal to (a) and (b) of FIG. 10. (c) of FIG. 11 is an enlarged perspective view of the BD diffraction area 4a and (d) of FIG. 11 is an enlarged perspective view of the HD diffraction area 3a. (c) of FIG. 11 is a diagram which enlarges the lattice (grating) formed on the diffraction element 16 and illustrates an amount of 3 pitches on the BD diffraction area 4a with regard to a pitch longer than the wavelength of the outgoing light beam emitted from the semiconductor laser 1. (d) of FIG. 11 is a diagram which enlarges the lattice (grating) formed on the diffraction element 16 and illustrates an amount of 3 pitches on the HD diffraction area 3a with regard to a pitch longer than the wavelength of the outgoing light beam emitted from the semiconductor laser 1.

As illustrated in (d) of FIG. 11, the HD diffraction area 3a has a periodic structure having a pitch P(HD) equal to or longer than the wavelength of an incident light beam which includes two kinds of sub-wavelength convexo-concave structures having a pitch q1(HD) and a pitch q2(HD) which are shorter than the wavelength of an incident light beam (refer to FIG. 3A). The two sub-wavelength convexo-concave structures are alternately arranged and adjacent and perpendicular to each structure. The incident light beam is diffracted by the periodic structure having a pitch equal to or longer than the wavelength of the incident light and the sub-wavelength convexo-concave structures determine which polarization component, i.e., P polarization component or S polarization component, is diffracted. Therefore, as illustrated in FIG. 12A, the diffraction element 16 partially diffracts a light beam of P polarization component and transmits a light beam of S polarization component in a dead-band manner.

Similarly, as illustrated in (c) of FIG. 11, the BD diffraction area 4a has a periodic structure having a pitch P(BD) equal to or longer than the wavelength of an incident light beam with two kinds of sub-wavelength convexo-concave structures having a pitch q1(BD) and a pitch q2(BD) which are shorter than the wavelength of an incident light beam (refer to FIG. 3B). The two sub-wavelength convexo-concave structures are alternately arranged and adjacent and perpendicular to each structure. The incident light is diffracted by the periodic structure having a pitch equal to or longer than the wavelength of the incident light and the sub-wavelength convexo-concave structures determine which polarization component, i.e., P polarization component or S polarization component, is diffracted. Therefore, as illustrated in FIG. 12B, the diffraction element 16 partially diffracts a light beam of S polarization component and transmits a light beam of P polarization component in a dead-band manner.

In this structure, the polarization direction of the outgoing light beam emitted from the light source 1 is switched by the polarization switching device 2 and the light path thereof is split by the polarization selective light path splitting device 6. To focus a light beam having a certain polarization component on the first optical recording medium 10, and the light beam having the other polarization component perpendicular to the certain polarization component on the second optical recording medium 15, the HD area 3a of the first diffraction element 16 provided on the upstream side relative to the polarization selective light path splitting device 6 performs 3 beam diffraction only when the light beam having a certain polarization enters into the diffraction element 16 provided on the upstream side relative to the polarization selective light path splitting device 6 and the BD area 4a of the diffraction element 16 performs 3 beam diffraction only when the light beam having the other polarization component perpendicular to the certain polarization component enters into the BD area 4a. Therefore, 3 beams corresponding to each optical recording medium are generated without transmission loss.

Embodiment 3

Figure 13:
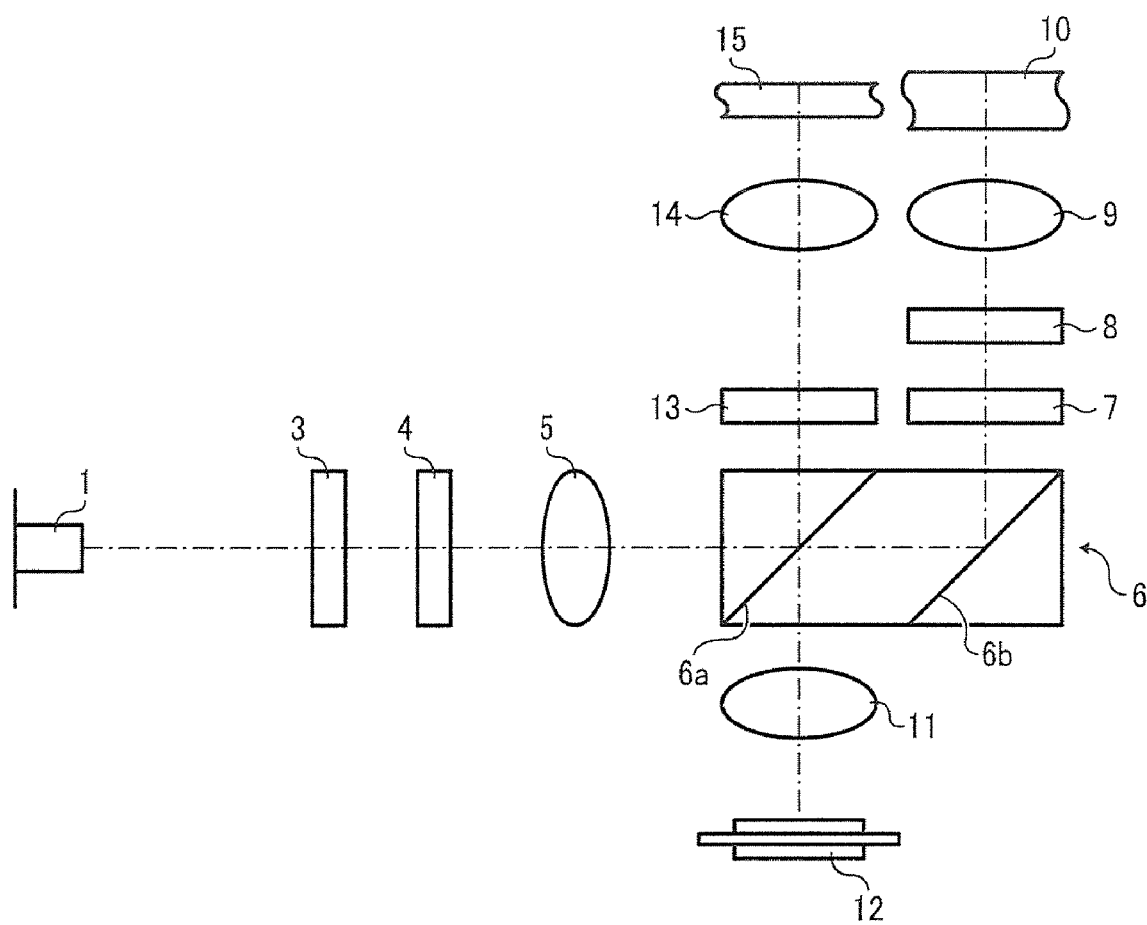
FIG. 13 is a schematic diagram illustrating an optical pickup employing a light source rotation system and two diffraction elements of polarization selection type of Example 3 described later of the present invention.

FIG. 13 is a schematic diagram of Embodiment 3 illustrating an optical pickup which employs a light source rotation system and two diffraction elements of polarization selection type. As illustrated in FIG. 13, the optical pickup of Embodiment 3 is the same as the optical pickup of Embodiment 1 described above in FIG. 1 except that no crystal element is provided.

Another difference between Embodiments 1 and 3 is that the polarization direction of the light source illustrated in FIG. 14A is rotated 45° from S polarization direction. The polarization component at 45° direction can be decomposed into P polarization component and S polarization component.

That is, the semiconductor laser 1 simultaneously emits a light beam of P polarization component and S polarization component.

This structure dispenses with the liquid crystal element 2 which functions as the electric device for use in Embodiment 1 and resultantly the number of man-hour for assembling an pickup is reduced, which leads to cost reduction.

Thereby, as illustrated in FIG. 14B, the HD diffraction element 3 diffracts only the S polarization component and the BD diffraction element 4 diffracts only the P polarization component. Two three beam diffusion elements for an optical recording medium are provided on the upstream side of the polarization beam splitter surface (not shown). Each is polarization selective so that three beams are generated without a loss in optical utilization efficiency. As in the case of Embodiment 1, in this structure, the collimate lens 5, the ½ wavelength board 7, the ¼ wavelength boards 8 and 13 and the detection lens 11 are optional.

In this structure, the outgoing light beam emitted from the light source 1 enters into the polarization selective light path splitting device 6 with a polarization direction forming 45° relative to the incident plane of the polarization selective light path splitting device 6 to split the light path of the light beam. To focus one light beam having one polarization component on the first optical recording medium 10 and the other light beam having a polarization direction perpendicular to that of the one light beam on the second optical recording medium 15, the first diffraction element 3 provided on the upstream side relative to the polarization selective light path splitting device 6 performs 3 beam diffraction only when the light beam having a certain polarization enters into the first diffraction element 3 and the second diffraction element 4 also provided on the upstream side relative to the polarization selective light path splitting device 6 performs 3 beam diffraction only when the light beam having the other polarization component perpendicular to the certain polarization component enters into the second diffraction element 4. Therefore, 3 beams corresponding to each optical recording medium are generated without transmission loss.

Embodiment 4

Figure 15:
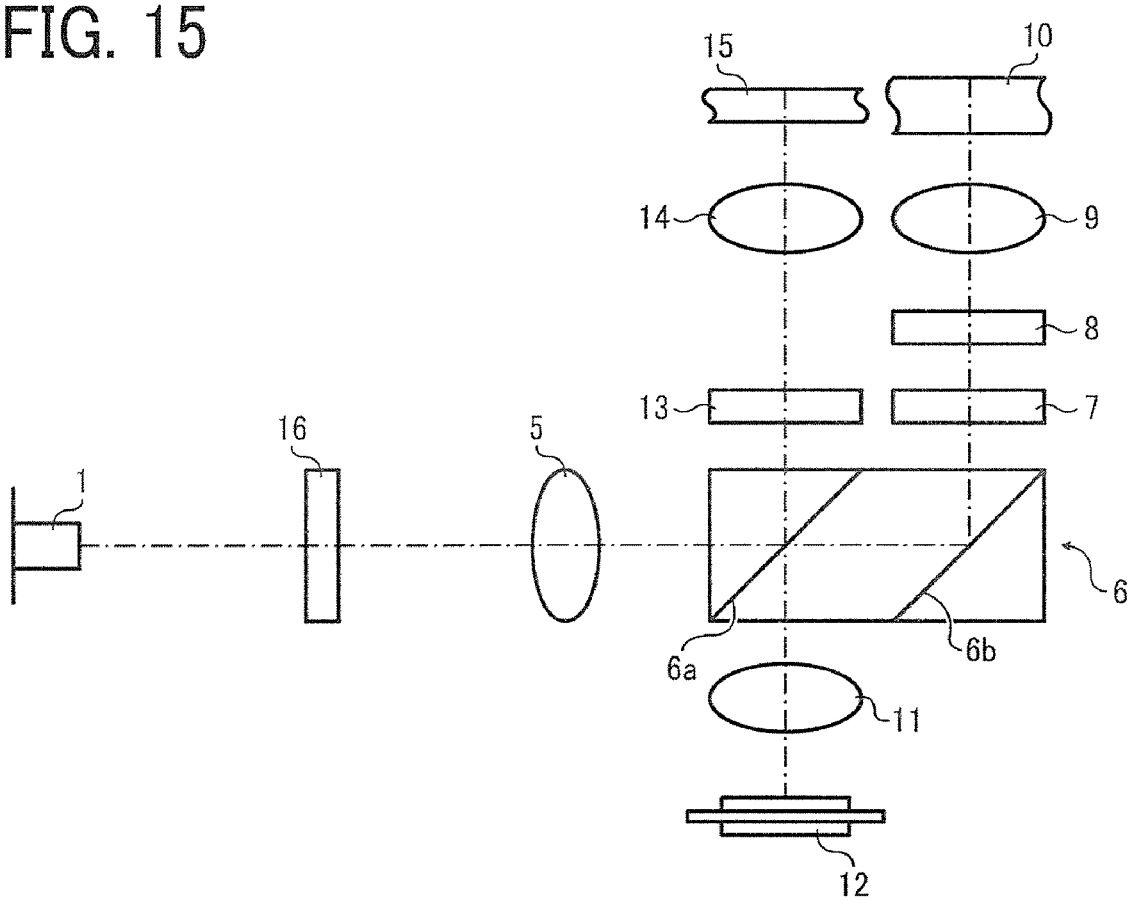
FIG. 15 is a schematic diagram illustrating an optical pickup employing a light source rotation system and a diffraction element of an area division type and of polarization selection type of Example 4 described later of the present invention.

FIG. 15 is a schematic diagram of Embodiment 4 illustrating an optical pickup which employs a light source rotation system and a diffraction element of an area division type and a polarization selection type. As illustrated in FIG. 15, the optical pickup of Embodiment 4 has the same diffraction element for 3 beams as that of Embodiment 2 with regard to the polarization direction of the same semiconductor laser of the optical pickup illustrated in FIG. 13 of Embodiment 3.

In comparison with the structure of the optical pickup of Embodiment 1, the optical pickup of Embodiment 4 does not require the liquid crystal 2 and has a single diffraction element, to be exact, a single plane, for three beams for an optical recording medium instead of the two diffraction elements of Embodiment 1. This reduces the man-hour of assembly, the cost and the size of the optical pickup. Additionally, as in the case of Embodiment 1, in this structure, the collimate lens 5, the ½ wavelength board 7, the ¼ wavelength boards 8 and 13 and the detection lens 11 are optional. The following is described about the structure having all the optional devices and elements.

In this structure, the outgoing light beam emitted from the light source 1 enters into the polarization selective light path splitting device 6 with a polarization direction forming 45° relative to the incident plane of the polarization selective light path splitting device 6 to split the light path of the light beam. To focus one light beam having one polarization component on the first optical recording medium 10 and the other light beam having a polarization direction perpendicular to that of the one light beam on the second optical recording medium 15, the HD area 3a of the first diffraction element 16 provided on the upstream side relative to the polarization selective light path splitting device 6 performs 3 beam diffraction only when the light beam having a certain polarization enters into the diffraction element 16 provided on the upstream side relative to the polarization selective light path splitting device 6 and the BD area 4a of the diffraction element 16 performs 3 beam diffraction only when the light beam having the other polarization component perpendicular to the certain polarization component enters into the BD area 4a. Therefore, 3 beams corresponding to each optical recording medium are generated without transmission loss.

The HD diffraction element 3 and the BD diffraction element 4 for three beams contained in the optical pickups of Embodiments 1 and 3 of the present invention are described in detail. The diffraction element 16 for three beams contained in the optical pickups of Embodiments 2 and 4 can be formed by dividing the area of one phase of the single element structure for the HD diffraction element 3 and the BD diffraction element 4.

As illustrated in the macro structures of the HD diffraction element 3 and the BD diffraction element 4 in (a) to (d) of FIG. 2, the HD diffraction element 3 has a lattice plane which diffracts a light beam of P polarization component and does not diffract but transmits a light beam of S polarization component. By contrast, the BD diffraction element 4 has a lattice plane which does not diffract but transmits a light beam of P polarization component and diffracts a light beam of S polarization component. In addition, the direction of the periodic lattice formed in the HD diffraction element 3 and the direction of the periodic lattice formed in the BD diffraction element 4 form a predetermined angle θ and θ2, respectively, with S polarization direction.

In addition, FIGS. 3A and 3B are enlarged diagrams illustrating the lattices (grating) formed on the HD diffraction element 3 and the BD diffraction element 4. The reference characters of the HD diffraction element 3 in FIG. 3A are described. The HD diffraction element 3 has a periodic structure having a pitch equal to or longer than the wavelength of an incident light beam emitted from the semiconductor laser 1 which is formed of two kinds of sub-wavelength convexo-concave structures A and B. The sub-wavelength convexo-concave structure A has grooves arranged along S polarization direction and the pitch thereof is shorter than the wavelength of the incident light. The sub-wavelength convexo-concave structure B has grooves arranged along P polarization direction and the pitch thereof is shorter than the wavelength of the incident light beam.

In FIG. 3A, P(HD) represents a pitch of the periodic structure formed on the HD diffraction element 3 and the pitch is equal to or longer than the wavelength of an incident light beam.

L(HD) represents the width of the area on which the sub-wavelength convexo-concave structure A described later is formed.

L(HD)/P(HD) is referred to as a duty of the diffraction element and used in calculation of the diffraction efficiency described later.

q1(HD) represents the pitch of the sub-wavelength convexo-concave structure A.

m1(HD) represents the width of the convex portion of the sub-wavelength convexo-concave structure A.

m1(HD)/q1(HD) is referred to as a filling factor and used in calculation of the diffraction efficiency described later.

q2(HD) represents the pitch of the sub-wavelength convexo-concave structure B.

m2(HD) represents the width of the convex portion of the sub-wavelength convexo-concave structure B.

m2(HD)/q2(HD) is referred to as a filling factor and used in calculation of the diffraction efficiency described later.

d1(HD) represents the depth of the groove of the sub-wavelength convexo-concave structure A.

d2(HD) represents the depth of the groove of the sub-wavelength convexo-concave structure B.

Next, the reference characters of the BD diffraction element 4 in FIG. 3B are described. The BD diffraction element 4 has a periodic structure having a pitch equal to or longer than the wavelength of an incident light beam emitted from the semiconductor laser 1 which is formed of two kinds of sub-wavelength convexo-concave structures C and D. The sub-wavelength convexo-concave structure C has grooves arranged along S polarization direction and the pitch thereof is shorter than the wavelength of the incident light. The sub-wavelength convexo-concave structure D has grooves arranged along P polarization direction and the pitch thereof is shorter than the wavelength of the incident light beam.

In FIG. 3B, P(BD) represents a pitch of the periodic structure formed on the BD diffraction element 4 and the pitch thereof is equal to or longer than the wavelength of an incident light beam.

L(BD) represents the width of the area on which the sub-wavelength convexo-concave structure C described later is formed.

L(BD)/P(BD) is referred to as a duty of the diffraction element and used in calculation of the diffraction efficiency described later.

q1(BD) represents the pitch of the sub-wavelength convexo-concave structure C.

m1(BD) represents the width of the convex portion of the sub-wavelength convexo-concave structure C.

m1(BD)/q1(BD) is referred to as a filling factor and used in calculation of the diffraction efficiency described later.

q2(BD) represents the pitch of the sub-wavelength convexo-concave structure D.

m2(BD) represents the width of the convex portion of the sub-wavelength convexo-concave structure D.

m2(BD)/q2(BD) is referred to as a filling factor and used in calculation of the diffraction efficiency described later.

d1(BD) represents the depth of the groove of the sub-wavelength convexo-concave structure C.

d2(BD) represents the depth of the groove of the sub-wavelength convexo-concave structure D.

When the effective refractive indices of the two kinds of sub-wavelength structure are the same, the two kinds of sub-wavelength structure are sensitive to the polarization direction.

As illustrated in FIG. 3A, the HD diffraction element 3 has a periodic structure having a pitch P(HD) equal to or longer than the wavelength of an incident light including the sub-wavelength concavoconvex structures A and B having a pitch of q1(HD) and q2(HD), respectively, which are shorter than the wavelength of the incident light. The incident light is diffracted by the periodic structure having a pitch equal to or longer than the wavelength of the incident light and the sub-wavelength convexo-concave structures determine which polarization component, i.e., P polarization component or S polarization component, is diffracted. Therefore, as illustrated in FIG. 4A, the HD diffraction element 3 diffracts a light beam of P polarization component and transmits a light beam of S polarization component in a dead-band manner.

Similarly, as illustrated in FIG. 3B, the BD diffraction element 4 has a periodic structure having a pitch P(BD) equal to or longer than the wavelength of an incident light beam with two kinds of sub-wavelength convexo-concave structures C and D having a pitch q1(BD) and a pitch q2(BD) which are shorter than the wavelength of an incident light beam. The incident light is diffracted by the periodic structure having a pitch equal to or longer than the wavelength of the incident light and the sub-wavelength convexo-concave structures determine which polarization component, i.e., P polarization component or S polarization component, is diffracted. Therefore, as illustrated in FIG. 4B, the BD diffraction element 4 diffracts a light beam having an S polarization component and transmits a light beam having a P polarization component in a dead-band manner.

The sub-wavelength convexo-concave structure formed on the plane of each diffraction element demonstrates the known structural double refraction.

The structural double refraction is that when two kinds of media having a different refraction index are arranged in a striping manner with a cyclic shorter than the wavelength of light, polarization component (TE wave) parallel to the stripe and polarization component (TM wave) vertical to the stripe have a different refraction index, which causes double refraction.

Assume that air and a medium having a refraction index of n are taken as the two media for the sub-wavelength concavo-convex structure. The two media have different refraction indices and a light beam having a wavelength at least twice the pitch of the sub-wavelength concavo-convex structure vertically enters into the sub-wavelength concavo-convex structure. The effective refraction ratio of the sub-wavelength concavoconvex structure is provided by the relationship (2) or (3) depending on whether the polarization direction of the incident light beam is parallel (TE wave direction) or perpendicular (TM wave direction) to the groove of the sub-wavelength convexo-concave structure.

$$n(TE) = \sqrt{t \times n^2 + (1-t)} \qquad \text{Relationship (2)}$$

$$n(TM) = \sqrt{\frac{t}{n^2} + (1-t)} \qquad \text{Relationship (3)}$$

n(TE) is an effective refraction index when the polarization direction of an incident light beam is parallel to the groove of the sub-wavelength convexo-concave structure and n(TM) is an effective refraction index when the polarization direction of an incident light beam is perpendicular to the groove of the sub-wavelength convexo-concave structure. The reference character t represents the filling factor described above.

Figure 16:
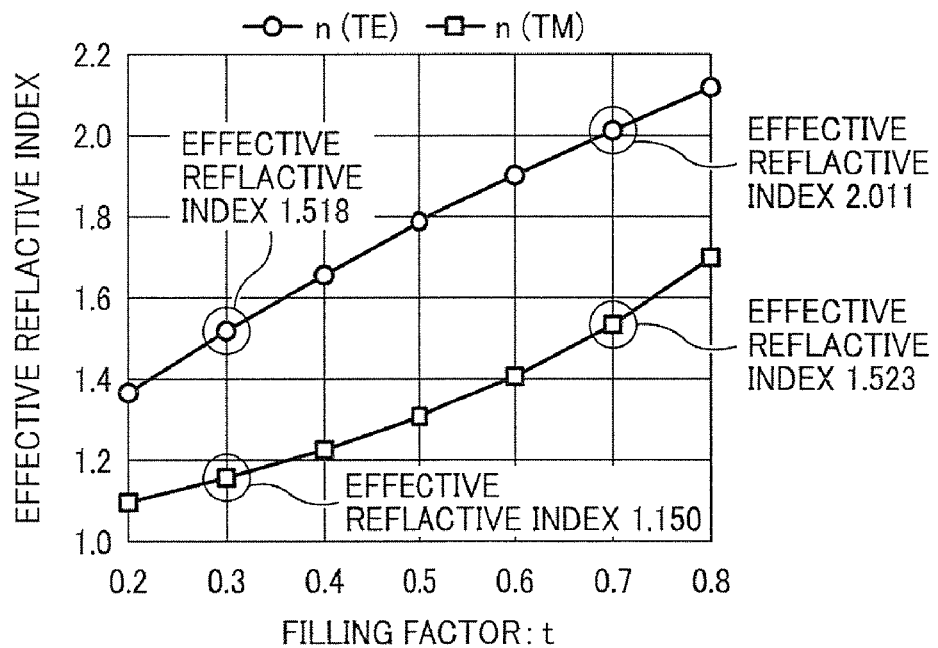
FIG. 16 is a graph illustrating the refraction index by the polarization direction for the filling factor.

FIG. 16 represents a graph illustrating the refraction index by the polarization direction against the filling factor and shows an example of the calculation results of respective refraction indices. For calculation, 2.313 and 405 nm are assigned for n and the wavelength, respectively.

The filling factors t of FIGS. 3A and 3B are as follows.

The filling factor t1(HD) of the sub-wavelength convexo-concave structure A is represented by the relationship (4).

$$t1(HD) = \frac{m1(HD)}{q1(HD)} \quad \text{Relationship (4)}$$

The filling factor t2(HD) of the sub-wavelength convexo-concave structure B is represented by the relationship (5).

$$t2(HD) = \frac{m2(HD)}{q2(HD)} \quad \text{Relationship (5)}$$

The filling factor t1(BD) of the sub-wavelength convexo-concave structure C is represented by the relationship (6).

$$t1(BD) = \frac{m1(BD)}{q1(BD)} \quad \text{Relationship (6)}$$

The filling factor t2(BD) of the sub-wavelength convexo-concave structure D is represented by the relationship (7).

$$t2(BD) = \frac{m2(BD)}{q2(BD)} \quad \text{Relationship (7)}$$

Therefore, the effective refraction indices of respective sub-wavelength convexo-concave structures are as follows:

The effective refraction index {n(TE, HD1)} in the TE direction having the sub-wavelength convexo-concave structure A is represented by the relationship (8).

$$n(TE,HD1) = \sqrt{t1(HD) \times n^2 + (1 - t1(HD))} \quad \text{Relationship (8)}$$

The effective refraction index {n(TM, HD1)} in the TM direction having the sub-wavelength convexo-concave structure A is represented by the relationship (9).

$$n(TM, HD1) = \sqrt{\frac{t1(HD)}{n^2} + (1 - t1(HD))} \quad \text{Relationship (9)}$$

The effective refraction index {n(TE, HD2)} in the TE direction having the sub-wavelength convexo-concave structure B is represented by the relationship (10).

$$n(TE,HD2) = \sqrt{t2(HD) \times n^2 + (1 - t2(HD))} \quad \text{Relationship (10)}$$

The effective refraction index {n(TM, HD2)} in the TM direction having the sub-wavelength convexo-concave structure B is represented by the relationship (11).

$$n(TM, HD2) = \sqrt{\frac{t2(HD)}{n^2} + (1 - t2(HD))} \quad \text{Relationship (11)}$$

The effective refraction index {n(TE, BD1)} in the TE direction having the sub-wavelength convexo-concave structure C is represented by the relationship (12).

$$n(TE,BD1) = \sqrt{t1(BD) \times n^2 + (1 - t1(BD))} \quad \text{Relationship (12)}$$

The effective refraction index {n(TM, BD1)} in the TM direction having the sub-wavelength convexo-concave structure C is represented by the relationship (13).

$$n(TM, BD1) = \sqrt{\frac{t1(BD)}{n^2} + (1 - t1(BD))} \quad \text{Relationship (13)}$$

The effective refraction index {n(TE, BD2)} in the TE direction having the sub-wavelength convexo-concave structure D is represented by the relationship (14).

$$n(TE,BD2) = \sqrt{t2(BD) \times n^2 + (1 - t2(BD))} \quad \text{Relationship (14)}$$

The effective refraction index {n(TM, BD2)} in the TM direction having the sub-wavelength convexo-concave structure D is represented by the relationship (15).

$$n(TM, BD2) = \sqrt{\frac{t2(BD)}{n^2} + (1 - t2(BD))} \quad \text{Relationship (15)}$$

The phase difference is as follows:

The phase difference {Ψ(HD, P polarization)} between the sub-wavelength convexo-concave structures A and B when a light beam having a P polarization direction enters is represented by the relationship (16).

$$\Psi(HD, P \text{ polarization}) = |2\pi/\lambda \{n(TM,HD1) \times d1(HD) - n(TE,HD2) \times d2(HD)\}| \quad \text{Relationship (16)}$$

The phase difference {Ψ(HD, S polarization)} between the sub-wavelength convexo-concave structures A and B when a light beam having an S polarization direction enters is represented by the relationship (17).

$$\Psi(HD,S \text{ polarization}) = |2\pi/\lambda \{n(TE,HD1) \times d1(HD) - n(TM,HD2) \times d2(HD)\}| \quad \text{Relationship (17)}$$

The phase difference {Ψ(BD, P polarization)} between the sub-wavelength convexo-concave structures C and D when a light beam having a P polarization direction enters is represented by the relationship (18).

$$\phi(BD, P偏光) = \left| \frac{2\pi}{\lambda}(n(TM, BD1) \times d1(BD) - n(TE, BD2) \times d2(BD)) \right| \quad \text{Relationship (18)}$$

$$\Psi(BD, P \text{ polarization}) = \left| 2\Pi/\lambda\{n(TM, BD1) \times d1(BD) - n(TE, BD2) \times d2(BD)\} \right|$$

The phase difference {Ψ(BD, S polarization)} between the sub-wavelength convexo-concave structures C and D when a light beam having an S polarization direction enters is represented by the relationship (19).

$$\Psi(BD,S \text{ polarization}) = |2\pi/\lambda\{n(TE,BD1) \times d1(BD) - n(TM,BD2) \times d2(BD)\}| \quad \text{Relationship (19)}$$

In the relationships (16) to (19), λ represents the wavelength used, and d represents the groove depth of the sub-wavelength convexo-concave structure. The phase difference can be arbitrarily adjusted by suitably selecting the filling factor and the groove depth d.

The HD diffraction element 3 has a lattice plane that diffracts a light beam of P polarization component and does not diffract but transmits a light beam of S polarization component. The phase difference is required to be 0 or 2nπ (n is an integer) to transmit a light beam of S polarization component in a dead-band manner.

Below is a specific example.

In the case of a medium having an n of 2.313 and the sub-wavelength convexo-concave structures A and B having the following effective refraction indices:

the filling factor of the sub-wavelength convexo-concave structure A: t1(HD)=0.30,
the filling factor of the sub-wavelength convexo-concave structure B: t2(HD)=0.70,
the effective refraction index of the sub-wavelength convexo-concave structure A in the TE direction: n(TE, HD1)=1.518,
the effective refraction index of the sub-wavelength convexo-concave structure A in the TM direction: n(TM, HD1)=1.150,
the effective refraction index of the sub-wavelength convexo-concave structure B in the TE direction: n(TE, HD2)=2.011
the effective refraction index of the sub-wavelength convexo-concave structure B in the TM direction: n(TM, HD2)=1.523,
and the groove depths of the sub-wavelength convexo-concave structures A and B are equal to d, the phase difference {ψ(HD, P polarization)} between the sub-wavelength convexo-concave structures A and B for a light beam of P polarization direction is $(2\pi d/\lambda) \times (2.011 - 1.150)$ and the phase difference ψ(HD, S polarization) between the sub-wavelength convexo-concave structures A and B for a light beam of S polarization is substantially equal to 0.

It is preferable that the difference between the effective refraction index of the sub-wavelength convexo-concave structure A in the TE direction: n(TE, HD1) and the effective refraction index of the sub-wavelength convexo-concave structure B in the TM direction: n(TM, HD2) is zero. However, it is technically difficult considering the refractive index dispersion of a material. Therefore, it is suitable that the difference is within about 0.05.

FIG. 17A is a graph illustrating the zero dimensional transmission factor and the one dimensional diffraction efficiency when a light beam enters the HD diffraction element 3 under the conditions specified above. Y axis represents the diffraction efficiency and X axis represents the groove depth of the sub-wavelength convexo-concave structure.

Since a light beam of S polarization component passes through the sub-wavelength convexo-concave structure in a dead-band manner, the zero dimensional light is 1.0 so that + or − one dimensional diffraction does not occur. By contrast, with regard to a light beam of P polarization component, the diffraction efficiency follows a sine curve. A ratio of + or − one dimensional diffraction light beams to a zero dimensional light beam can be suitably determined by selecting a groove depth to detect suitable DPP signals, That is, the degree of the diffraction is determined. For example, the position having a diffraction ratio of 0.1 is marked in FIG. 17A.

In addition, the BD diffraction element 4 has a lattice plane that diffracts a light beam of S polarization component and does not diffract but transmits a light beam of P polarization component. The phase difference is required to be 0 or 2nπ (n is an integer) to transmit a light beam of P polarization component in a dead-band manner.

The reason of determining the filling factors of the two kinds of sub-wavelength convexo-concave structures of the first diffraction element to substantially equalize the effective refractive indices of the two kinds of sub-wavelength convexo-concave structures of the first diffraction element with regard to the polarization direction of the outgoing light beam emitted from the light source is that a light beam is transmitted in a dead-band manner depending on the polarization direction.

Below is a specific example.

In the case of a medium having an n of 2.313 and the sub-wavelength convexo-concave structures C and D have the following effective refraction indices:
the filling factor of the sub-wavelength convexo-concave structure C: t1(BD)=0.70,
the filling factor of the sub-wavelength convexo-concave structure D: t2(BD)=0.30,
the effective refraction index of the sub-wavelength convexo-concave structure C in the TE direction: n(TE, BD1)=2.011,
the effective refraction index of the sub-wavelength convexo-concave structure C in the TM direction: n(TM, BD1)=1.523,
the effective refraction index of the sub-wavelength convexo-concave structure D in the TE direction: n(TE, BD2)=1.518
the effective refraction index of the sub-wavelength convexo-concave structure D in the TM direction: n(TM, BD2)=1.150,
and the groove depths of the sub-wavelength convexo-concave structures C and D are equal to d,
the phase difference {ψ(BD, P polarization)} between the sub-wavelength convexo-concave structures C and D for a light beam of P polarization is substantially zero and the phase difference {ψ(BD, S polarization)} between the sub-wavelength convexo-concave structures C and D for a light beam of S polarization is $(2n\pi d/\lambda) \times (2.011 - 1.150)$.

It is preferable that the difference between the effective refraction index of the sub-wavelength convexo-concave structure C in the TM direction: n(TM, BD1) and the effective refraction index of the sub-wavelength convexo-concave structure D in the TE direction: n(TE, BD2) is zero. However, it is technically difficult considering the refractive index dispersion of a material. Therefore, it is suitable that the difference is within about 0.05.

FIG. 17B is a graph illustrating the zero dimensional transmission factor and the one dimensional diffraction efficiency when a light beam enters the BD diffraction element 4 under the conditions specified above. Y axis represents the diffraction efficiency and X axis represent the groove depth of the sub-wavelength convexo-concave structure.

Since a light beam of P polarization component passes through the sub-wavelength convexo-concave structure in a dead-band manner, the zero dimensional light is 1.0 so that + or − one dimensional diffraction does not occur. By contrast, with regard to a light beam of S polarization component, the diffraction efficiency follows a sine curve. A ratio of + or − one dimensional diffraction light beams to a zero dimensional light beam can be suitably determined by selecting a groove depth to detect suitable DPP signals, That is, the degree of the diffraction is determined. For example, the position having a diffraction ratio of 0.1 is marked in FIG. 17B.

Next, the build process of the diffraction elements of each Example described above is described below. First, a method of manufacturing a design of the diffraction element is described prior to manufacturing of the diffraction element.

FIGS. 18A to 18D are process drawings to describe a method of manufacturing a design using quartz as the base material. In FIG. 18A, a basal plate is formed of a quartz material 55 and a resist 56 for drawing an electron beam 57 is applied with a predetermined thickness to the surface of the quartz material 55 followed by pre-baking. According to the pre-designed program, the electron beam 57 having a pitch and a line width reflecting specifications of a diffraction element to be manufactured is drawn on the resist 56.

In FIG. 18B, the resist 56 is subject to development and rinsing treatment so that the sub-wavelength convexo-concave structure 58 is formed on the resist 56. The quartz material 55 is exposed on the bottom of the groove.

FIG. 18C is a diagram illustrating a process drawing of dry-etching the quartz material 55 using the resist pattern of the sub-wavelength convexo-concave structure 58 as a mask. Etching is conducted by an etching device using, for example, RIE (Reactive Ion Etching), NLD (Magnetic Neutral Loop discharge) or TCP (Transformer Coupled Plasma) with $CF_4$ (tetrafluoro methane) gas. Etching is conducted vertically to the plane by applying a bias to the basal board.

FIG. 18D is a diagram illustrating a process drawing of peeling off the resist 56. The resist 51 is peeled by a method in which oxygen gas is introduced and the resist is removed in oxygen gas plasma in the dry-etching device, or a method in which the basal plate is removed from the dry-etching device and the resist is removed by cleansing it with CAROS (a liquid mixture of sulfuric acid and hydrogen peroxide solution). The product is used as the quartz type. Reference symbols a, b and d represent a land width (convex portion width), a space width (concave portion width) and a depth of the concave portion.

In addition, FIGS. 19A to 19D are process drawings to describe a method of manufacturing a design using silicon as the base material. In FIG. 19A, a basal plate is formed of a silicon material 59 and a resist 56 for drawing an electron beam 57 is applied with a predetermined thickness to the surface of the silicon material 56 followed by pre-baking. According to the pre-designed program, the electron beam 57 having a pitch and a line width reflecting specifications of a diffraction element to be manufactured is drawn on the resist 56.

In FIG. 19B, the resist 56 is subject to development and rinsing treatment so that the sub-wavelength convexo-concave structure 58 is formed on the resist 56. The silicon material 59 is exposed on the bottom of the groove.

FIG. 19C is a diagram illustrating a process drawing of alkali wet etching the silicon material 59 with a KOH solution using the resist pattern of the sub-wavelength convexo-concave structure 58 as a mask. The silicon material 59 is etched in the depth direction as a wall of the plane while the pitch of the sub-wavelength convexo-concave structure 58 is maintained. A dry-etching method using Bosch process can be suitably used to make the same structure.

FIG. 19D is a diagram illustrating a process drawing of peeling the resist 56. The product is used as the silicon type.

The thus manufactured quartz type and silicon type are also referred to as a mold for convenience.

FIGS. 20A to 20G are process drawings illustrating the procedure of filming $Ta_2O_5$ on a glass substrate and forming a diffraction element on the $Ta_2O_5$ film.

Figure 20:
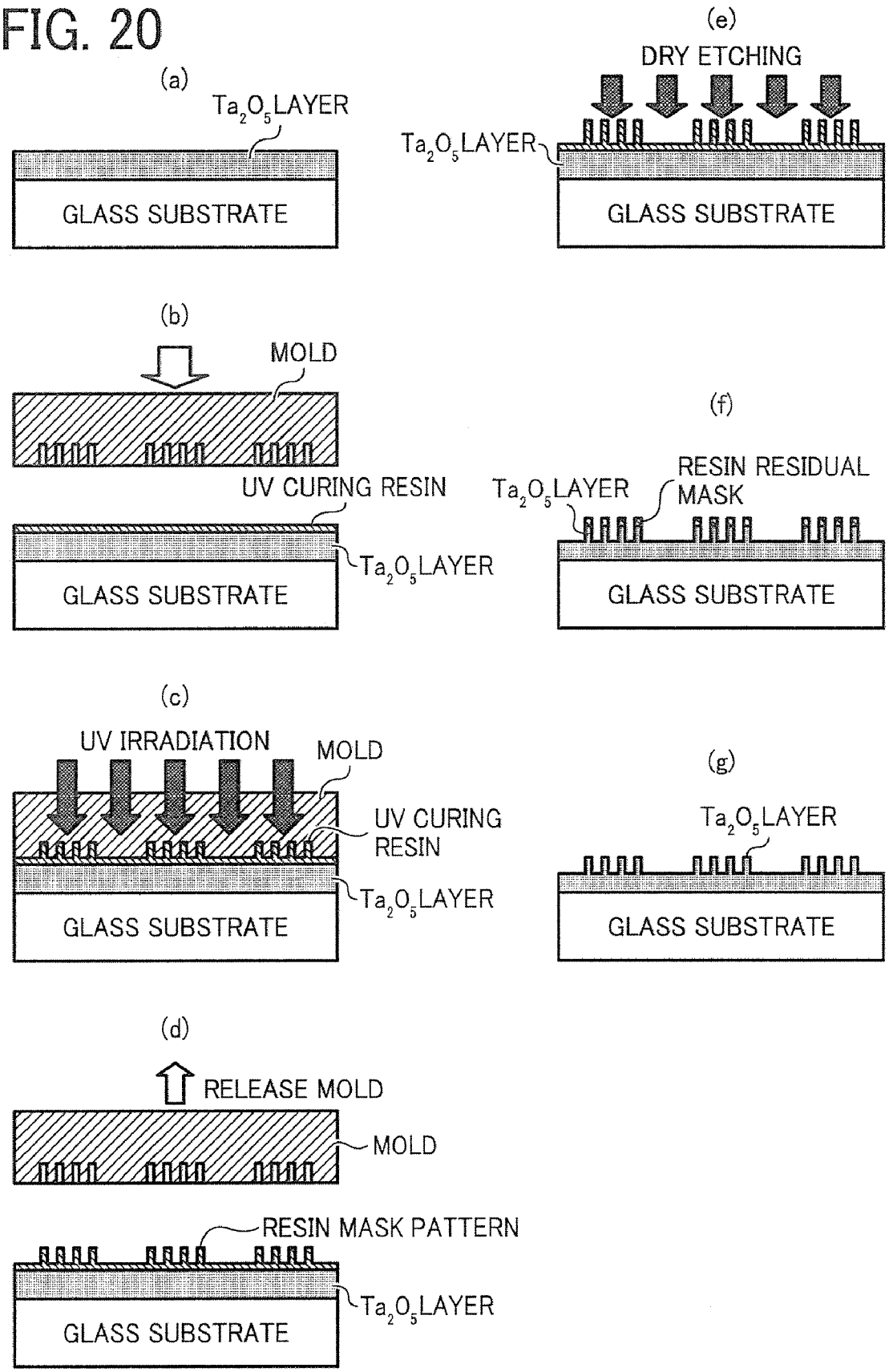
FIGS. 20A to 20G are process drawings illustrating procedures of forming a $Ta_2O_5$ film on a glass substrate and forming a diffraction element on the $Ta_2O_5$ film.

FIG. 20A is a diagram illustrating a process of forming a $Ta_2O_5$ film (tantalum pentaoxide film) on the surface of a glass substrate.

The $Ta_2O_5$ film is formed by a sputtering method under the following conditions:
1. Substrate temperature: 70 to 100° C.
2. Pressure during film forming: 5 to $8 \times 10^{-4}$ Torr
3. Film forming speed: 0.7 to 1.0 Å/sec
4. RF power: 300 to 500 W.

FIG. 20B is a diagram illustrating a process of applying a UV curing resin on the $Ta_2O_5$ film and pressing the $Ta_2O_5$ film with a mold from above. The silicon type and the quartz type can be both used as the mold and the quartz type is more suitable for a nano imprint which forms a fine structure than the silicon type since the quartz type is light transmissible. Grandic RC8790 (manufactured by DIC Corporation) is used as the UV curing resin.

FIG. 20C is a diagram illustrating a process of irradiating the back of the mold with ultraviolet to cure (harden) the UV curing resin. When the silicon type is used as the mold, ultraviolet is caused to enter from the glass substrate side.

FIG. 20D is a diagram illustrating a process of peeling off (releasing) the mold. A convex fine structure is formed on the UV curing resin on the glass substrate. FIG. 20E is a diagram illustrating a process of dry-etching the resin until the $Ta_2O_5$ film is exposed. The dry-etching is conducted under the following conditions:
1. Gas: Oxygen ($O_2$)
2. Flow amount of gas: 20 sccm
3. Pressure: 0.4 Pa
4. Resin etching speed: 30 nm/sec
5. Upper part bias voltage: 1 kW
6. Lower part bias voltage: 60 W.

FIG. 20F is a diagram illustrating a process of dry-etching until the groove of $Ta_2O_5$ has a desired depth. This dry-etching is conducted under the following conditions:
1. Gas: $CHF_3$ (trifluoromethane) and Ar (argon)
2. Flow amount of gas: Ar: 5 sccm
   $CHF_3$: 20 sccm
3. Pressure: 0.3 Pa
4. $Ta_2O_5$ etching speed: 8 nm/sec
5. Upper part bias voltage: 1 kW
6. Lower part bias voltage: 400 W.

Finally, the resin mask remaining on the uppermost part is peeled off by dry-etching in oxygen gas (plasma).

FIG. 20G is a diagram illustrating a manufactured diffraction element formed of tantalum pentaoxide on the glass substrate.

In addition, FIGS. 21A to 21I are process drawings illustrating a procedure of forming a diffraction element on the glass substrate using a silicon film and a mold.

Figure 21:
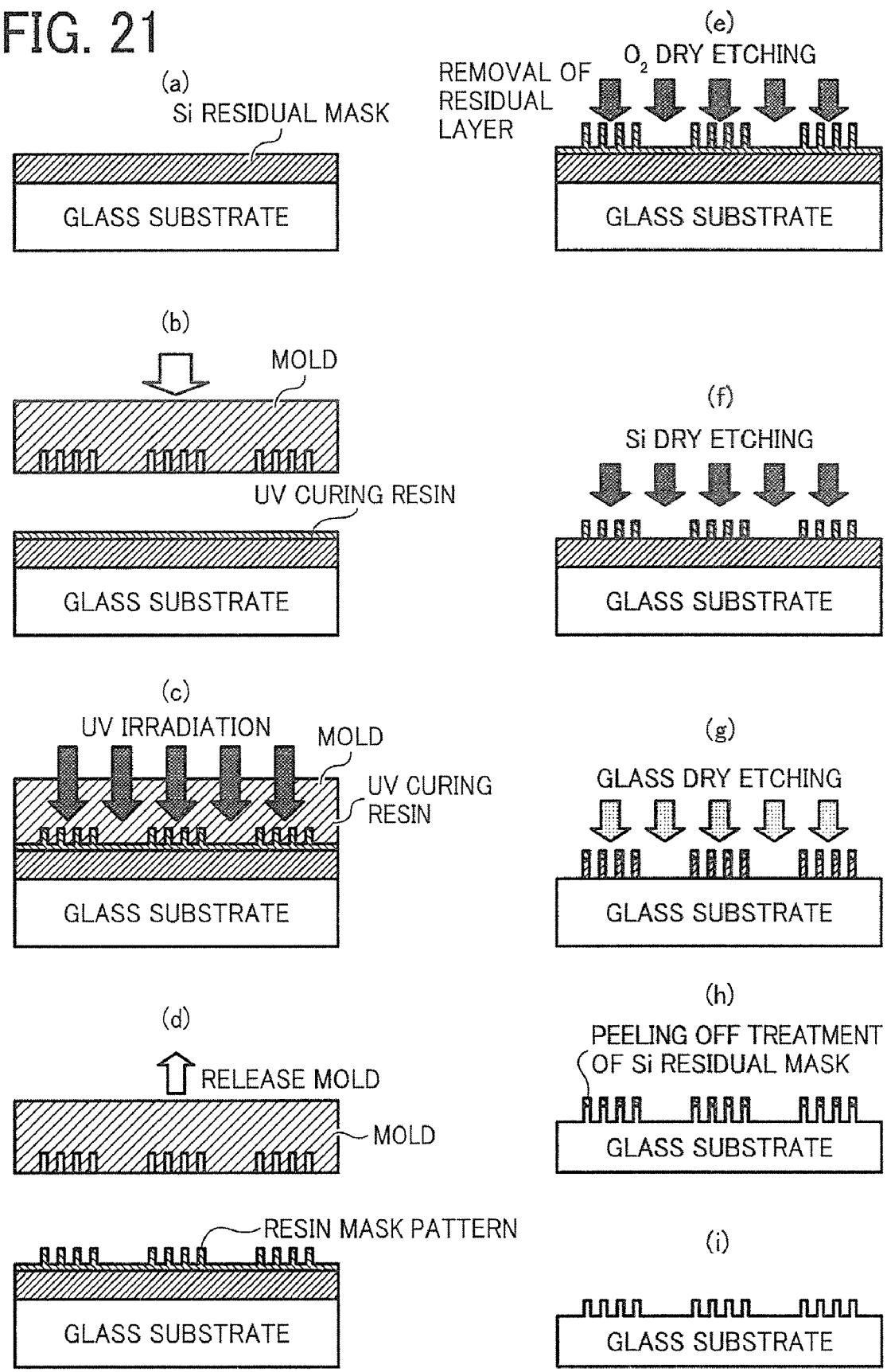
FIGS. 21A to 21I are process drawings illustrating procedures of forming a diffraction element on a glass substrate using a silicon film and a mold.

FIG. 21A is a diagram illustrating a process of forming a silicon (Si) film on the surface of a glass substrate. The silicon film is formed by a sputtering method under the following conditions:
1. Substrate temperature: 70 to 100° C.
2. Pressure during film forming: 7 to $8 \times 10^{-4}$ Torr
3. Film forming speed: 0.5 to 1.0 Å/sec
4. RF power: 100 to 200 W.

FIG. 21B is a diagram illustrating a process of applying a UV curing resin on the silicon film and pressing the silicon film with a mold from above. The silicon type and the quartz type can be both used as the mold and the quartz type is more suitable for a nano imprint which forms a fine structure than the silicon type since the quartz type is light transmissible. Grandic RC8790 (manufactured by DIC Corporation) is used as the UV curing resin.

FIG. 21C is a diagram illustrating a process of irradiating the back of the mold with ultraviolet to cure (harden) the UV curing resin. When the silicon type is used as the mold, ultraviolet enters from the glass substrate side.

FIG. 21D is a diagram illustrating a process of peeling (releasing) the mold. A convex fine structure is formed on the UV curing resin on the glass substrate.

FIG. 21E is a diagram illustrating a process of dry-etching the resin until the silicon film is exposed. The dry-etching is conducted under the following conditions:
1. Gas: Oxygen ($O_2$)
2. Flow amount of gas: 20 sccm
3. Pressure: 0.4 Pa
4. Resin etching speed: 30 nm/sec
5. Upper part bias voltage: 1 kW
6. Lower part bias voltage: 60 W.

FIG. 21F is a diagram illustrating a process of dry-etching the silicon film and the resin until the glass substrate is exposed. This dry-etching is conducted under the following conditions:
1. Gas: $CHF_3$ (trifluoromethane) and $SF_6$ (sulfur hexaoxide)
2. Flow amount of gas: $SF_6$: 20 sccm
   $CHF_3$: 5 sccm
3. Pressure: 0.3 Pa 4. Resin etching speed: 5 nm/sec
  Silicon etching speed: 30 nm/sec
5. Upper part bias voltage: 1 kW
6. Lower part bias voltage: 50 W.

FIG. 21G is a diagram illustrating a process of dry-etching until the groove on the glass substrate has a desired depth. This dry-etching is conducted under the following conditions:
1. Gas: $CHF_3$ (trifluoromethane) and Ar (argon)
2. Flow amount of gas: Ar: 5 sccm
  $CHF_3$: 20 sccm
3. Pressure: 0.3 Pa
4. Silicon etching speed: 4 nm/sec
  Glass etching speed: 12 nm/sec
5. Upper part bias voltage: 1 kW
6. Lower part bias voltage: 400 W.

FIG. 21H is a diagram illustrating a process of peeling off the silicon film remaining on the uppermost part. The silicon mask is wet-peeled with an alkali (KOH) solution.

FIG. 21I is a diagram illustrating a manufactured diffraction element formed on one side of the glass substrate.

FIGS. 22A to 22G are process drawings to describe a method of manufacturing a diffraction element without using a mold.

Figure 22:
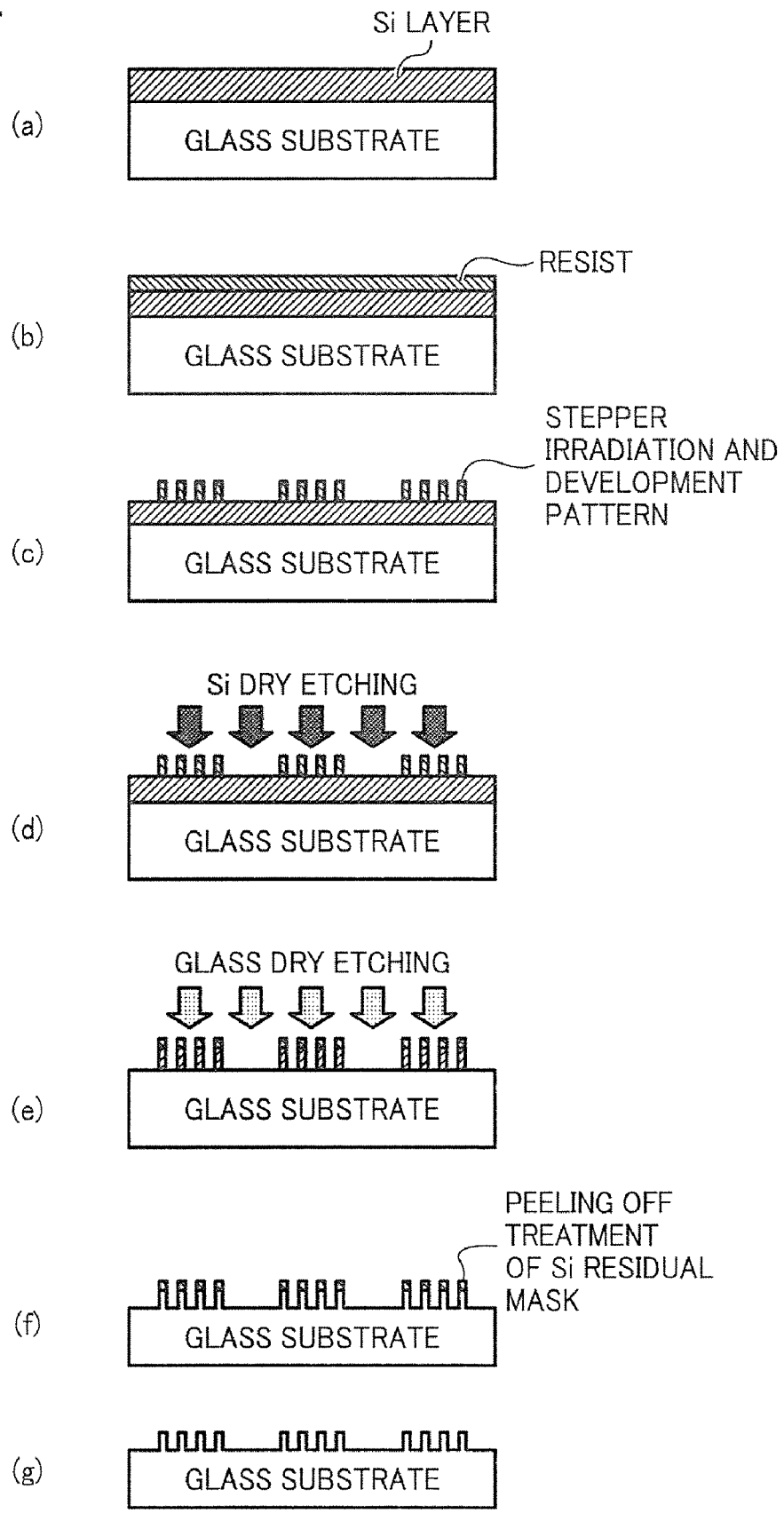
FIGS. 22A to 22G are process drawings illustrating a method of manufacturing a diffraction element without using a mold.

FIG. 22A is a diagram illustrating a process of forming a silicon film on the surface of a glass substrate. The silicon film is formed by a sputtering method under the following conditions:
1. Substrate temperature: 70 to 100° C.
2. Pressure during film forming: 7 to $8 \times 10^{-4}$ Torr
3. Film forming speed: 0.5 to 1.0 Å/sec
4. RF power: 100 to 200 W.

FIG. 22B is a diagram illustrating a process of applying a resist for electron beam on the silicon film.

In FIG. 22C, I-line stepper is used by a high precision fine width irradiation device, etc. Subsequent to irradiation, the resist is partially removed after a development process to expose the silicon film. The remaining resist is a mask pattern for the subsequent etching.

FIG. 22D is a diagram illustrating a process of dry-etching the silicon film until the glass substrate is exposed. The dry-etching is conducted under the following conditions:
1. Gas: $CHF_3$ (trifluoromethane) and $SF_6$ (sulfur hexaoxide)
2. Flow amount of gas: $SF_6$: 20 sccm
  $CHF_3$: 5 sccm
3. Pressure: 0.4 Pa
4. Silicon etching speed: 30 nm/sec
6. Upper part bias voltage: 1 kW
6. Lower part bias voltage: 50 W.

FIG. 22E is a diagram illustrating a process of dry-etching until the groove on the glass substrate has a desired depth. This dry-etching is conducted under the following conditions:
1. Gas: $CHF_3$ (trifluoromethane) and Ar (argon)
2. Flow amount of gas: Ar: 5 sccm
  $CHF_3$: 20 sccm
3. Pressure: 0.3 Pa
4. Glass etching speed: 12 nm/sec
5. Upper part bias voltage: 1 kW
6. Lower part bias voltage: 400 W.

FIG. 22F is a diagram illustrating a process of peeling off the silicon film remaining on the uppermost part. The silicon mask is wet-peeled with an alkali (KOH) solution.

FIG. 22G is a diagram illustrating a manufactured diffraction element formed on one side of the glass substrate.

Embodiment 5

Figure 23:
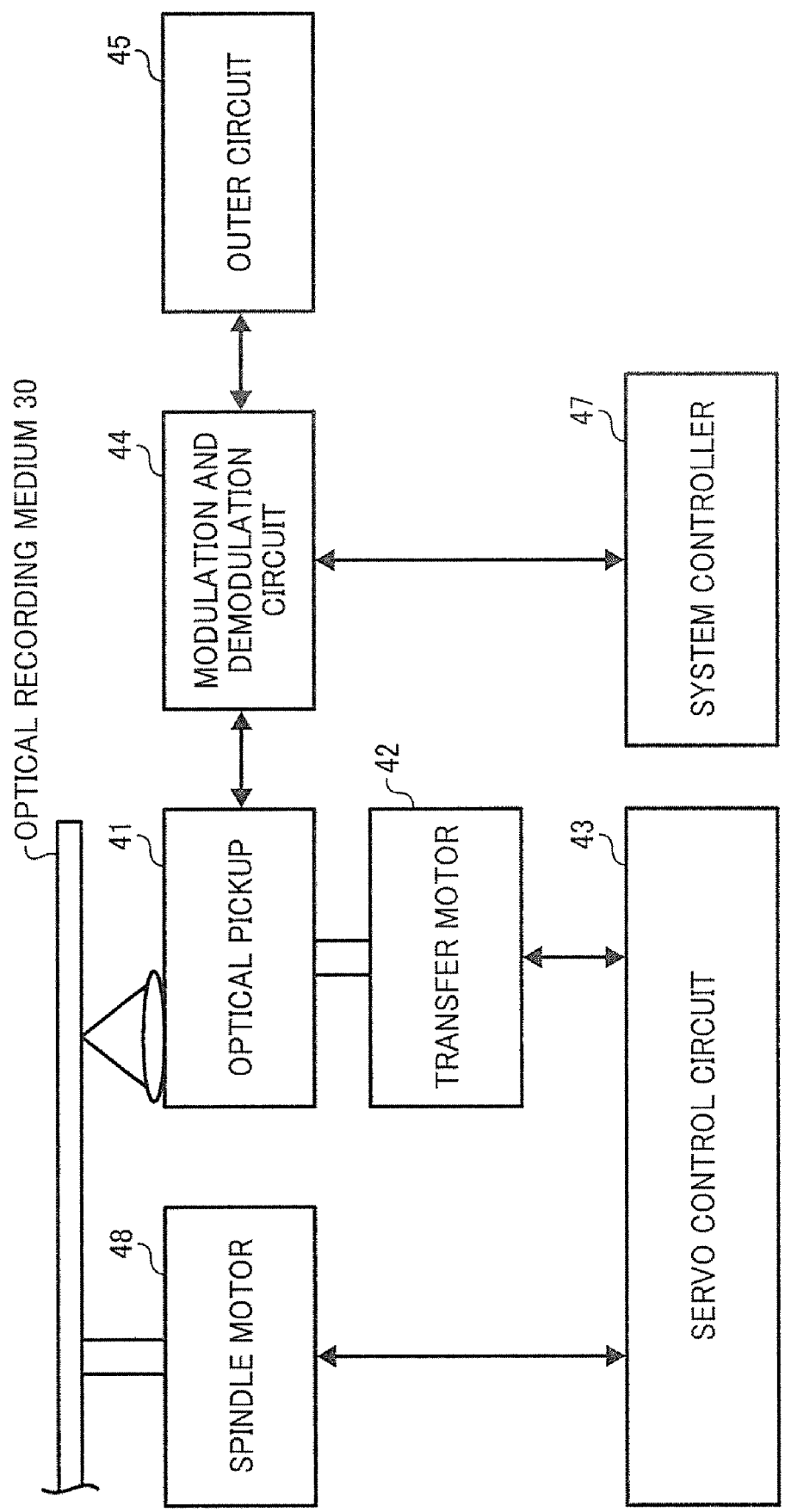
FIG. 23 is a block chart illustrating an optical data processing device of Example 5 described later of the present invention.
Figure 24:
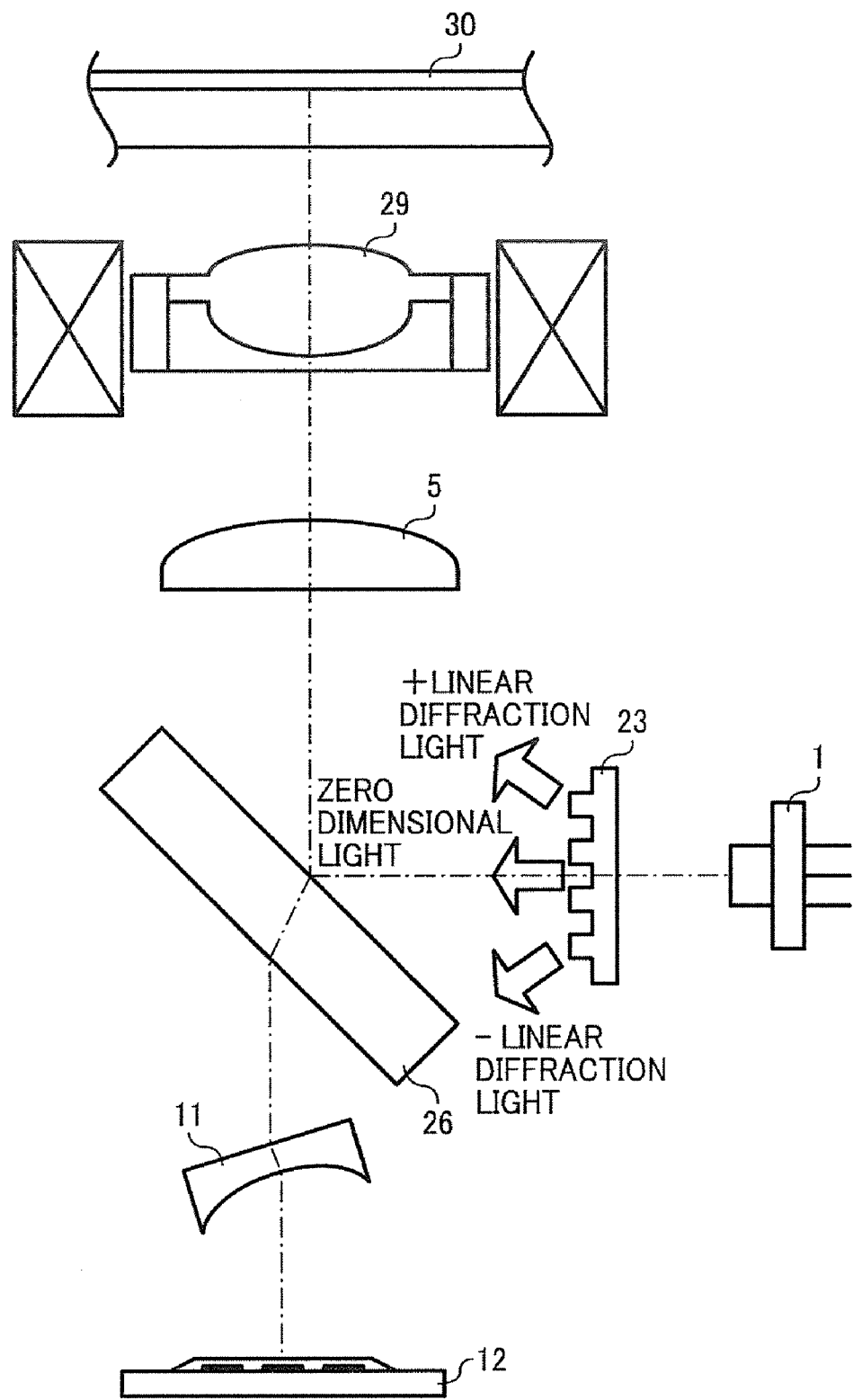
FIG. 24 is a schematic diagram illustrating the structure of an optical pickup employing a typical DPP system.
Figure 25:
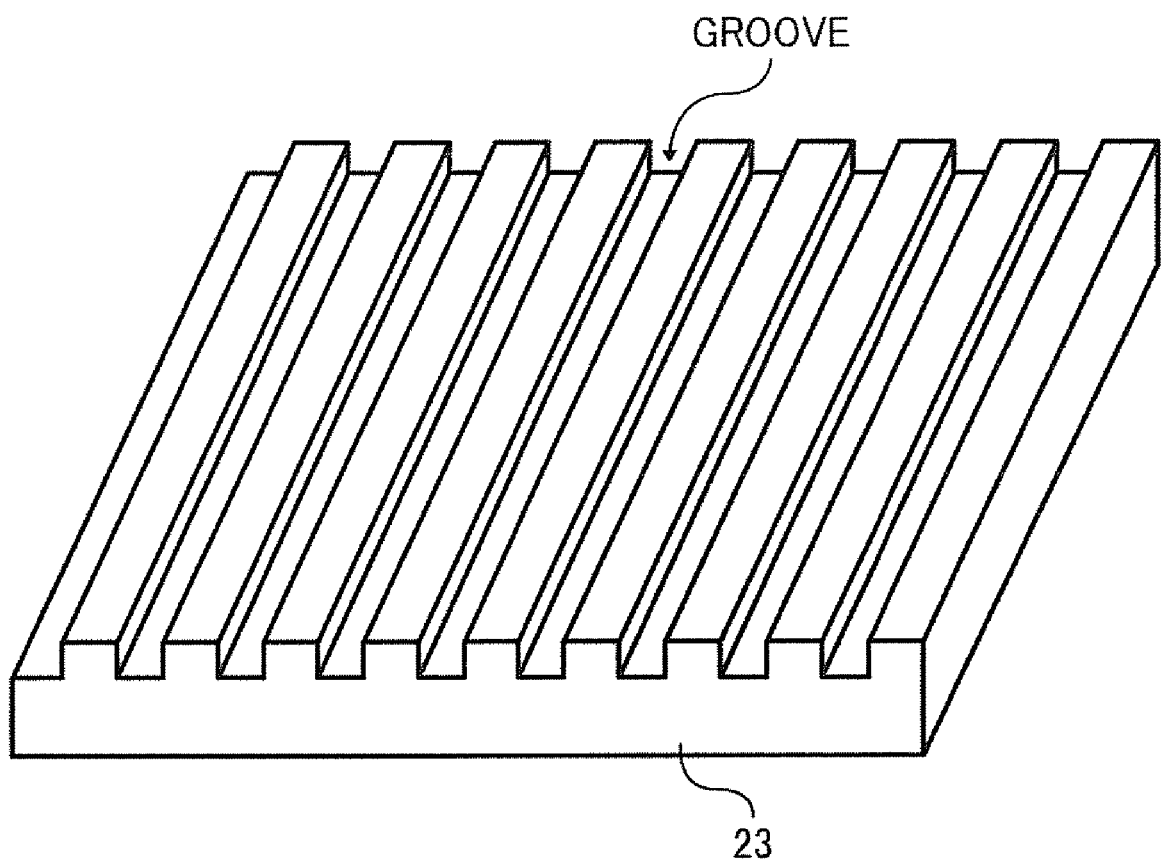
FIG. 25 is a diagram illustrating an example of the structure of a diffraction element.
Figure 26:
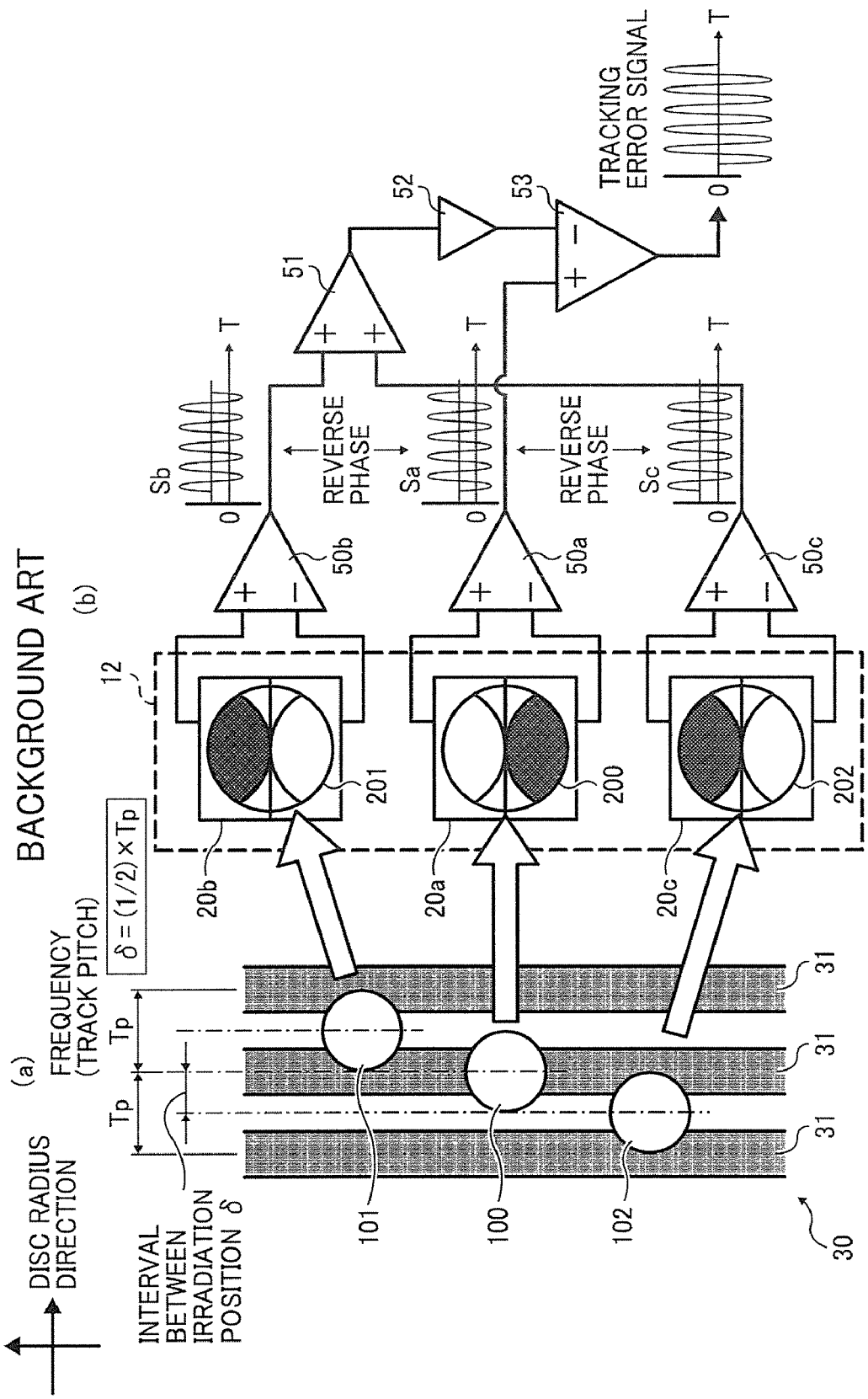
FIG. 26 is a diagram illustrating light focus spots on an optical recording medium and a calculation circuit.
Figure 27:
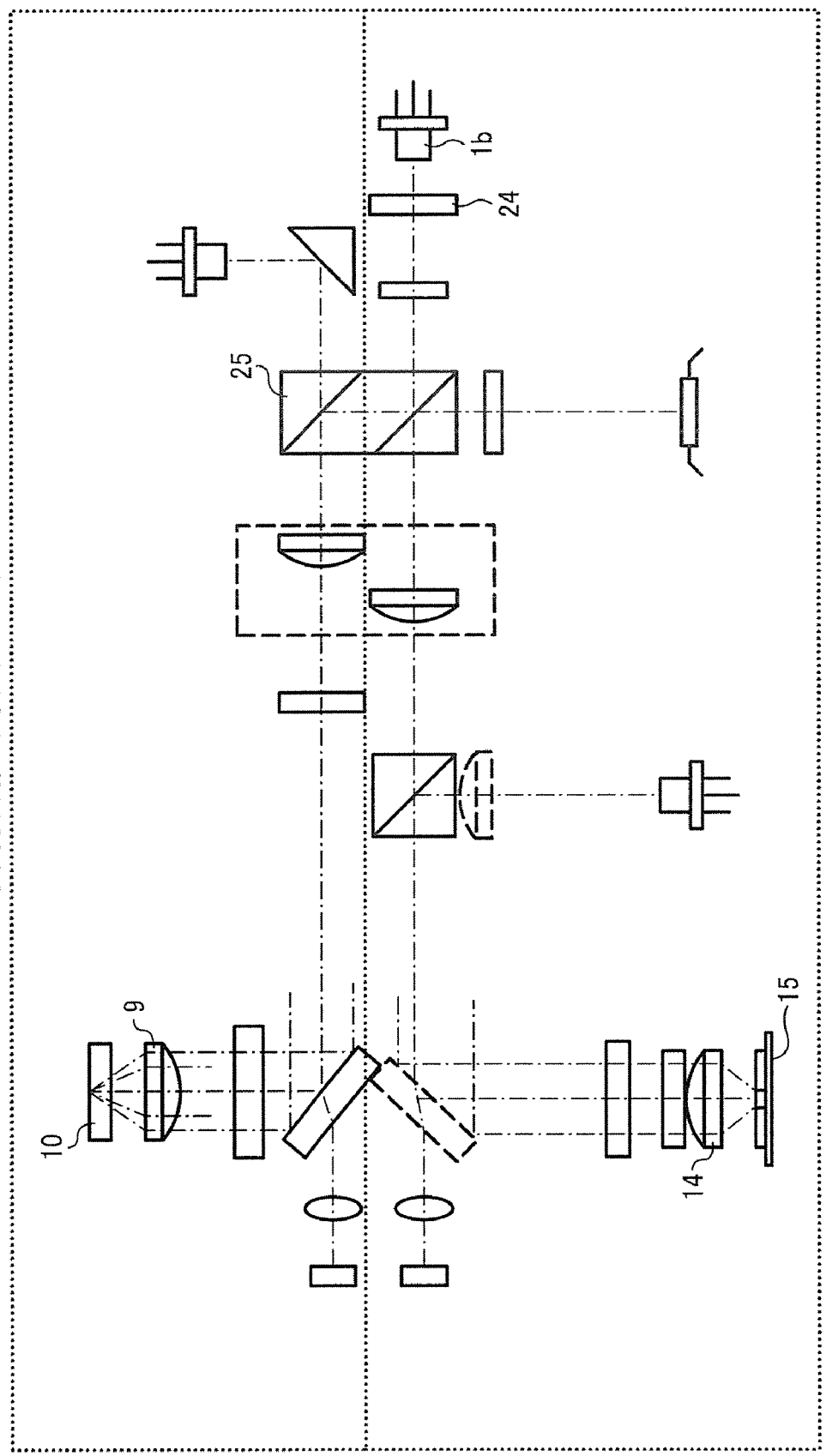
FIG. 27 is a schematic diagram illustrating the structure of a typical optical system.

FIG. 23 is a block chart illustrating an optical data processing device of Embodiment 5 of the present invention. As illustrated in FIG. 23, the optical data processing device is a device which records and plays data signals for an optical recording medium 30 and includes an optical pickup 41 corresponding to the optical pickups described above; a spindle motor 48 to rotate the optical recording medium 30; a transfer motor 42 to move the optical pickup 41 to and from the inner and outer circle of the optical recording medium 30; a modulation and demodulation circuit 44 to perform predetermined modulation and demodulation; a servo control circuit 43 to servo-control the optical pickup 41; and a system controller 47 to control the entire optical data processing device.

The servo control circuit 43 controllably drives and rotates the spindle motor 48 at a predetermined rotation number. The optical recording medium 30 to be recorded and played is chucked on the driving axis of the spindle motor 48 and rotationally scanned at a predetermined rotation number by the spindle motor 48 controllably driven by the servo control circuit 43.

When the optical recording pickup 41 records and plays the data signals against the optical recording medium 30, the optical recording pickup 41 irradiates the rotationally driven optical recording medium 30 with a laser beam and detects the return light beam as described above. This optical pickup 41 is connected to the modulation and demodulation circuit 44. Before data signals are recorded, the data signals are input from an outer circuit 45, modulated by the modulation and demodulation circuit 44 and then supplied to the optical pickup 41. According to the signals supplied from the modulation and demodulation circuit 44, the optical pickup 41 irradiates the optical recording medium 30 with a laser beam modulated with regard to the optical intensity.

In addition, when playing data signals, the optical pickup 41 irradiates the rotationally driven optical recording medium 30 with a laser beam having a constant output power and generates play signals from the return light beam. Thereafter, the play signals are supplied to the modulation and demodulation circuit 44.

Furthermore, the optical pickup 41 is also connected to the servo control circuit 43. When recording and playing the data signals, the focus servo signals and the tracking servo signals are generated from the return light beam reflected by the rotationally driven optical recording medium 30 as described above and supplied to the servo control circuit 43.

The modulation and demodulation circuit 44 is connected to the system controller 47 and the outer circuit 45. When data signals are recorded on the optical recording medium 30, the modulation and demodulation circuit 44 receives signals to be recorded on the optical recording medium 30 from the outer circuit 45 under the control of the system controller 47 and modulates the signals in a predetermined manner. The signals modulated by the modulation and demodulation circuit 44 is supplied to the optical pickup 41.

In addition, when data signals on the optical recording medium 30 are read (played), the modulation and demodulation circuit 44 receives the play signals read from the optical recording medium 30 from the optical pickup 41 and demodulates the play signals in a predetermined manner. The demodulated signals demodulated by the modulation and demodulation circuit 44 are output from the modulation and demodulation circuit 44 to the outer circuit 45.

The transfer motor 42 is driven by the control signal from the servo control circuit 43, thereby transferring the optical pickup 41 to a predetermined position along the diameter direction of the optical recording medium 30. That is, the transfer motor 42 is connected to the servo control circuit 43 and controlled thereby.

The servo control circuit 43 controls the transfer motor 42 by which the optical pickup 41 is transferred to a predetermined position facing the optical recording medium 30 under the control of the system controller 47. In addition, the servo control circuit 43 is also connected to the spindle motor 48 and controls the behavior thereof under the control of the system controller 47. That is, the servo control circuit 43 controls the spindle motor 48 to rotationally drive the optical recording medium 30 in a predetermined rotation number when recording or playing data signals on the optical recording medium 30.

By this structure, with regard to recording and playing data signals on multiple kinds of optical recording media having different track pitches, track error signals reflecting improvement on the amplification deterioration of the track error signals ascribable to the displacement of an objective lens and the remaining off track amount can be detected so that data on multiple kinds of optical recording media can be recorded or played with high reliability.

This document claims priority and contains subject matter related to Japanese Patent Application No. 2008-065713, filed on Mar. 14, 2008, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An optical pickup comprising:
a light source;
a first light focus device configured to focus a light beam on a recording surface of a first optical recording medium;
a second light focus device configured to focus a light beam on a recording surface of a second optical recording medium having a different track pitch from that of the first optical recording medium;
a light reception device configured to receive a reflected light beam from the first optical recording medium and the second optical recording medium;
a polarization selective light path splitting device provided between the light source and the first light focus device and the second light focus device, the polarization selective light path splitting device being configured to split an incident light beam incident to the first light focus device and the second light focus device depending on a polarization direction of the incident light beam;
a polarization switching device provided between the light source and the polarization selective light path splitting device, the polarization switching device being configured to switch a polarization direction of an outgoing light beam emitted from the light source depending on which one of the first optical recording medium or the second optical recording medium is targeted;
a first diffraction element provided between the polarization selective light path splitting device and the polarization switching device, the first diffraction element being configured to diffract a light beam having a polarization direction perpendicular to a polarization direction of the outgoing light beam emitted from the light source; and
a second diffraction element provided between the polarization selective light path splitting device and the polarization switching device, the second diffraction element being configured to diffract a light beam having a polarization direction parallel to the polarization direction of the outgoing light beam emitted from the light source,
wherein the first diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and filling factors of the two kinds of sub-wavelength convexo-concave structures of the first diffraction element are determined to substantially equalize effective refractive indices of the two kinds of sub-wavelength convexo-concave structures of the first diffraction element with regard to the polarization direction of the outgoing light beam emitted from the light source, and
wherein the second diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and filling factors of the two kinds of sub-wavelength convexo-concave structures of the second diffraction element are determined to substantially equalize effective refractive indices of the two kinds of sub-wavelength convexo-concave structures of the second diffraction element with regard to a polarization direction perpendicular to the polarization direction of the outgoing light beam emitted from the light source.

2. An optical pickup comprising:
a light source;
a first light focus device configured to focus a light beam on a recording surface of a first optical recording medium;
a second light focus device configured to focus a light beam on a recording surface of a second optical recording medium having a different track pitch from that of the first optical recording medium;
a light reception device configured to receive a reflected light beam from the first optical recording medium and the second optical recording medium;
a polarization selective light path splitting device provided between the light source and the first light focus device and the second light focus device, the polarization selective light path splitting device being configured to split an incident light beam incident to the first light focus device and the second light focus device depending on a polarization direction of the incident light beam;
a polarization switching device provided between the light source and the polarization selective light path splitting device, the polarization switching device being configured to switch a polarization direction of an outgoing light beam emitted from the light source depending on which one of the first optical recording medium or the second optical recording medium is targeted; and
a diffraction element provided between the polarization selective light path splitting device and the polarization switching device, the diffraction element comprising a first area which diffracts a light beam having a polarization direction perpendicular to a polarization direction of the outgoing light beam emitted from the light source and a second area which diffracts a light beam having a polarization direction parallel to the polarization direction of the outgoing light beam emitted from the light source, wherein the first area of the diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the first area are alternately arranged at right angles to each other, and filling factors of the two kinds of sub-wavelength convexo-concave structures of the first area are determined to substantially equalize effective refractive indices of the two kinds of sub-wavelength convexo-concave structures of the first area with regard to the polarization direction of the outgoing light beam emitted from the light source, and wherein the second area of the diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the second area are alternately arranged at right angles to each other, and filling factors of the two kinds of sub-wavelength convexo-concave structures of the second area are determined to substantially equalize effective refractive indices of the two kinds of sub-wavelength convexo-concave structures of the second area regard to a polarization direction perpendicular to the polarization direction of the outgoing light beam emitted from the light source.

3. An optical pickup comprising:

a light source;

a first light focus device configured to focus a light beam on a recording surface of a first optical recording medium;

a second light focus device configured to focus a light beam on a recording surface of a second optical recording medium having a different track pitch from that of the first optical recording medium;

a light reception device configured to receive a reflected light beam from the first optical recording medium and the second optical recording medium;

a polarization selective light path splitting device provided between the light source and the first light focus device and the second light focus device, the polarization selective light path splitting device being configured to split an incident light beam incident to the first light focus device and the second light focus device depending on a polarization direction of the incident light beam;

a first diffraction element provided between the polarization selective light path splitting device and the light source, the first diffraction element being configured to diffract a light beam having a polarization direction forming an angle of −45° with respect to a polarization direction of an outgoing light beam emitted from the light source; and a second diffraction element provided between the polarization selective light path splitting device and the light source, the second diffraction element being configured to diffract a light beam having a polarization direction forming an angle of +45° with respect to the polarization direction of the outgoing light beam emitted from the light source, wherein the first diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and filling factors of the two kinds of sub-wavelength convexo-concave structures of the first diffraction element are determined to substantially equalize effective refractive indices of the two kinds of sub-wavelength convexo-concave structures of the first diffraction element with regard to a polarization direction forming an angle of +45° to the outgoing light beam emitted from the light source, and wherein the second diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the second diffraction element are alternately arranged at right angles to each other, and filling factors of the two kinds of sub-wavelength convexo-concave structures of the second diffraction element are determined to substantially equalize effective refractive indices of the two kinds of sub-wavelength convexo-concave structure of the second diffraction element with regard to a polarization direction forming an angle of −45° to the outgoing light beam emitted from the light source.

4. An optical pickup comprising:

a light source;

a first light focus device configured to focus a light beam on a recording surface of a first optical recording medium;

a second light focus device configured to focus a light beam on a recording surface of a second optical recording medium having a different track pitch from that of the first optical recording medium;

a light reception device configured to receive a reflected light beam from the first optical recording medium and the second optical recording medium;

a polarization selective light path splitting device provided between the light source and the first light focus device and the second light focus device, the polarization selective light path splitting device being configured to split an incident light beam incident to the first light focus device and the second light focus device depending on a polarization direction of the incident light beam; and a diffraction element provided between the polarization selective light path splitting device and the light source, the diffraction element comprising a first area which diffracts a light beam having a polarization direction forming an angle of −45° with respect to a polarization direction of the outgoing light beam emitted from the light source and a second area which diffracts light having a polarization direction forming a polarization direction having an angle of +45° with respect to the polarization direction of the outgoing light beam emitted from the light source, wherein the light source is provided such that the polarization direction of the outgoing light beam emitted from the light source forms +45° with respect to a polarization selection direction of the polarization selective light path splitting device, wherein the first area of the diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the first diffraction element are alternately arranged at right angles to each other, and filling factors of the two kinds of sub-wavelength convexo-concave structures of the first diffraction element are determined to substantially equalize effective refractive indices of the two kinds of sub-wavelength convexo-concave structures of the first area with regard to a polarization direction forming +45° with respect to the polarization direction of the outgoing light beam emitted from the light source, and wherein the second area of the diffraction element has a periodic structure having a pitch equal to or longer than a wavelength of the outgoing light beam emitted from the light source, the periodic structure comprises two kinds of sub-wavelength convexo-concave structures having respective pitches shorter than the wavelength of the outgoing light beam emitted from the light source while the two kinds of sub-wavelength convexo-concave structures of the second area are alternately arranged at right angles to each other, and filling factors of the two kinds of sub-wavelength convexo-concave structures of the second diffraction element are determined to substantially equalize effective refractive indices of the two kinds of sub-wavelength convexo-concave structures of the second area with regard to a polarization direction forming −45° with respect to the polarization direction of the outgoing light beam emitted from the light source.

5. An optical data processing device comprising:
a spindle motor;
a servo control circuit;
a system controller; and
the optical pickup of claim 1.

* * * * *